US008775975B2

(12) United States Patent
Karmarkar et al.

(10) Patent No.: US 8,775,975 B2
(45) Date of Patent: Jul. 8, 2014

(54) EXPECTATION ASSISTED TEXT MESSAGING

(75) Inventors: Amit V. Karmarkar, Palo Alto, CA (US); Richard R. Peters, Mill Valley, CA (US); Sharada Karmarkar, Palo Alto, CA (US)

(73) Assignee: Buckyball Mobile, Inc., Palo Alto, CA (US)

( * ) Notice: Subject to any disclaimer, the term of this patent is extended or adjusted under 35 U.S.C. 154(b) by 119 days.

(21) Appl. No.: 13/208,184

(22) Filed: Aug. 11, 2011

(65) Prior Publication Data

US 2012/0094700 A1   Apr. 19, 2012

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/485,562, filed on May 14, 2011, provisional application No. 61/393,894, filed on Oct. 16, 2010, provisional application No. 61/420,775, filed on Dec. 8, 2010, provisional application No. 61/161,763, filed on Mar. 19, 2009.

(51) Int. Cl.
*G06F 3/00* (2006.01)

(52) U.S. Cl.
USPC ............................ 715/863; 455/466; 345/473

(58) Field of Classification Search
USPC ............................ 715/863; 455/466; 345/473
See application file for complete search history.

(56) References Cited

U.S. PATENT DOCUMENTS

| 6,601,021 | B2 | 7/2003 | Card et al. |
| 6,785,869 | B1 * | 8/2004 | Berstis ........................ 715/210 |
| 7,029,121 | B2 | 4/2006 | Edwards |
| 7,120,880 | B1 | 10/2006 | Dryer et al. |
| 7,233,684 | B2 | 6/2007 | Fedorovskaya et al. |
| 7,327,505 | B2 | 2/2008 | Fedorovskaya et al. |
| 7,366,500 | B1 * | 4/2008 | Yalovsky et al. .......... 455/414.1 |
| 7,389,917 | B2 | 6/2008 | Abraham et al. |
| 7,762,665 | B2 | 7/2010 | Vertegaal et al. |
| 7,783,487 | B2 | 8/2010 | Inoue et al. |
| 7,904,507 | B2 | 3/2011 | Jung et al. |
| 8,315,652 | B2 * | 11/2012 | Grant et al. ................... 455/466 |
| 2003/0038754 | A1 | 2/2003 | Goldstein et al. |
| 2003/0093311 | A1 | 5/2003 | Knowlson |
| 2003/0128389 | A1 | 7/2003 | Matraszek et al. |

(Continued)

OTHER PUBLICATIONS

U.S. Appl. No. 13/208,184, Aug. 11, 2011, Karmarkar et al.

(Continued)

*Primary Examiner* — Kieu Vu
*Assistant Examiner* — Andrew Chung

(57) ABSTRACT

In one exemplary embodiment, a text message may be sent in which eye-tracking data is used to associate information with a portion of the text message. A text message input by a user may be displayed, with eye-tracking data from the user indicating an expectation associated with a portion of the text message. The expectation may cause information related to the portion of the text message to be associated with the portion of the message.

15 Claims, 13 Drawing Sheets

(56) References Cited

U.S. PATENT DOCUMENTS

| | | | |
|---|---|---|---|
| 2005/0120305 A1* | 6/2005 | Engstrom et al. | 715/760 |
| 2005/0136955 A1* | 6/2005 | Mumick et al. | 455/466 |
| 2006/0093998 A1 | 5/2006 | Vertegaal | |
| 2006/0256382 A1 | 11/2006 | Matraszek et al. | |
| 2007/0255807 A1 | 11/2007 | Hayashi et al. | |
| 2007/0263978 A1 | 11/2007 | Yang et al. | |
| 2008/0012701 A1 | 1/2008 | Kass et al. | |
| 2008/0270248 A1 | 10/2008 | Brill | |
| 2009/0023422 A1 | 1/2009 | MacInnis et al. | |
| 2009/0023428 A1 | 1/2009 | Behzad et al. | |
| 2009/0164131 A1 | 6/2009 | Jung et al. | |
| 2009/0215479 A1* | 8/2009 | Karmarkar | 455/466 |
| 2009/0222550 A1 | 9/2009 | McAfee et al. | |
| 2009/0228439 A1 | 9/2009 | Manolescu et al. | |
| 2009/0292702 A1 | 11/2009 | Jung et al. | |
| 2010/0046842 A1 | 2/2010 | Conwell | |
| 2010/0086204 A1 | 4/2010 | Lessing | |
| 2010/0115114 A1 | 5/2010 | Headley | |
| 2010/0122174 A1 | 5/2010 | Snibbe et al. | |
| 2010/0153175 A1 | 6/2010 | Pearson et al. | |
| 2010/0180029 A1 | 7/2010 | Fourman | |
| 2010/0306054 A1 | 12/2010 | Drake et al. | |
| 2010/0325218 A1 | 12/2010 | Castro et al. | |
| 2011/0087955 A1* | 4/2011 | Ho et al. | 715/230 |
| 2012/0001923 A1* | 1/2012 | Weinzimmer et al. | 345/473 |
| 2012/0236143 A1 | 9/2012 | Weatherhead | |
| 2013/0024272 A1 | 1/2013 | Pradeep et al. | |

OTHER PUBLICATIONS

U.S. Appl. No. 11/052,729, Feb. 7, 2005, Yamasaki.

Affectivadotcom. (Oct. 5, 2010). "Say Hello to the Q™ Sensor," located at <<http://www.youtube.com/watch?v=b4XD1DE96Pg>>, last visited on Mar. 29, 2011, two pages.

Anonoymous. (Oct. 13, 2010). "NEC's Biometric Technology and the Future of Advertising," located at <http://eyetrackingupdate.com/2010/10/13/necs-biometic-technology-future-advertsising/>, last visited on Mar. 29, 2011, five pages.

Anonoymous. (Oct. 5, 2010). "Eye Tracking and Augmented Reality: The Future of Advertising," located at <http://eyetrackingupdate.com/2010/10/05/eye-tracking-augmented-reality-future-advertising/>, last visited on Mar. 29, 2011, six pages.

COGAIN 2005. (May 31. 2005). "COGAIN Communication by Gaze Interaction," *Proceedings of the First Conference on Communication by Gaze Interaction*, May 31, 2005, Copenhagen, Denmark, pp. 2-38.

Jung, J.J. (2009). "Contextualized Mobile Recommendation Service Based on Interactive Social Network Discovered From Mobile Users," *Expert Systems with Applications* 36:11950-11956.

Kaminski, J.Y. et al. (2006). "Head Orientation and Gaze Detection From a Single Image," *VISAPP 2006—Image Understanding*, pp. 85-92.

Lee, H-K. et al. (2010). "Personalized Recommendation System for the Social Network Services Based on Psychographics," *2010 Fifth International Conference on Internet and Web Applications and Service*, May 9-15, 2010, pp. 91-95.

Lohr, S. (Jan. 1, 2011). "Computers That See You and Keep Watch Over You," located at <http://www.nytimes.com/2011/01/02/science/02see.html? r=1 &pagewaned=print>, last visited on Feb. 9, 2011, eight pages.

Miluzzo, E. et al. (2010). "EyePhone: Activating Mobile Phones With Your Eyes," *MobiHeld 2010*, Aug. 30, 2010, New Delhi, India, six pages.

Miluzzo, E. et al. (Oct. 2007). "CenceMe—Injecting Sensing Presence Into Social Networking Applications," *Proceedings of the $2_{nd}$ European Conference on Smart Sensing and Context*, Lake District, United Kingdom, Oct. 23-25, 2007, pp. 1-28.

Nagamatsu, T. et al. (Apr. 2010). "MobiGaze: Development of a Gaze Interface for Handheld Mobile Devices," *CHI 2010: Work in Progress (Spotlight on Posters Days 1 & 2 )*, Apr. 12-13, 2010, Atlanta, Georgia, pp. 3349-3354.

Picard, R. et al. (Jan. 14, 2008). "Research on Sensing Human Affect," located at <http://affect.media.mit.edu/areas.php?id-sensing>, last visited on Mar. 29, 2011, five pages.

Provost, F. et al. (2009). "Audience Selection for On-Line Brand Advertising: Privacy-Friendly Social Network Targeting," *KDD 2009*, Jun. 28-Jul. 1, 2009, Paris, France, pp. 707-715.

Steel, E. (Feb. 28, 2011). "The Billboard That Knows," located at <http://online.wsj.com>, last visited on Feb. 28, 2011, two pages.

Sun, T. et al. (2010). "iLife: A Novel Mobile Social Network Service on Mobile Phones," 2010 $10^{th}$ *IEEE International Conference on Computer and Information Technology (CIT 2010)*, pp. 2920-2924.

Treiber, M. et al. (2010). "Context-Aware Campaigns in Social Networks," *2010 Fifth International Conference on Internet and Web Applications and Services*, pp. 61-66.

Zhu, J. et al. (2002). "Subpixel Eye Gaze Tracking," *FGR 2002 Proceedings of the Fifth IEEE International Conference on Automatic Face and Gesture Recognition*, six pages.

Interference in immediate spatial memory MM Smyth, KA Scholey—Memory & Cognition, 22 (1), 1-13, 1994—Springer.

Wikipedia contributors. "Caudate nucleus." Wikipedia, The Free Encyclopedia. Wikipedia, The Free Encyclopedia, Apr. 19, 2013. Web. Aug. 12, 2013.

Use of motor pathways in comprehension of syntactically ambiguous sentences.by: L. A. Stowe, R. G. Withaar, A. A. Wijers, M. Haverkort Journal of cognitive neuroscience1999 48.

Cognitive Mechanisms Underlying Second Language Listening Comprehension—Guiling Hu Georgia State University—Applied Linguistics and English as a Second Language Dissertati.

Cooke, A., DeVita, et al., 2000. Information processing speed duringfunctional neuroimaging of sentence comprehension. J. Cogn. Neurosci. 12, S43 (Atbstract only).

Eye Tracking Reading Study http://www.youtube.com/watch?v=VFIZDZwdf-0&NR=1 Uploaded on May 29, 2009.

Activations of "motor" and other non-language structures during sentence comprehension Stowe et al, 2004 Brain and Language, 89, 290-299.

\* cited by examiner

EXPECTATION ASSISTED TEXT MESSAGING

CROSS-REFERENCE TO RELATED APPLICATIONS

This application claims priority from U.S. Provisional Application No. 61/485,562, filed May 12, 2011; U.S. Provisional Application No. 61/393,894, filed Oct. 16, 2010; and U.S. Provisional. Application No. 61/420,775, filled Dec. 8, 2010. The provisional applications are hereby incorporated by reference in their entirety for all purposes. This application is also a continuation-in-art of and claims priority from currently pending patent application Ser. No. 12/422,313 filed on Apr. 13, 2009 which claims priority from provisional application 61/161,763 filed on Mar. 19, 2009, patent application Ser. No. 12/422,313 is a continuation-in-art of Ser. No. 11/519,600 filed Sep. 11, 2006, which was patented as U.S. Pat. No. 7,551,935, which is a continuation-in-part of Ser. No. 11/231,575 filed Sep. 21, 2005 which was patented as U.S. Pat. No. 7,580,719.

BACKGROUND OF THE INVENTION

1. Field

This application relates generally to parsing and annotating text from biological responses (bioresponse) to text data, and more specifically to a system, article of manufacture, and method for parsing and annotating text from biological responses to text data.

2. Related Art

Biological response (bioresponse) data is generated by monitoring a person's biological reactions to visual, aural, or other sensory stimuli. Bioresponse may entail rapid simultaneous eye movements (saccades), eyes focusing on a particular word or graphic for a certain duration, hand pressure on a device, galvanic skin response, or any other measurable biological reaction. Bioresponse data may further include or be associated with detailed information on what prompted a response. Eye-tracking systems, for example, may indicate a coordinate location of a particular visual stimuli—like a particular word in a phrase or figure in an image—and associate the particular stimuli with a certain response. This association may enable a system to identify specific words, images, portions of audio, and other elements that elicited a measurable biological response from the person experiencing the multimedia stimuli. For instance, a person reading a book may quickly read over some words while pausing at others. Quick eye movements, or saccades, may then be associated with the words the person was reading. When the eyes simultaneously pause and focus on a certain word for a longer duration than other words, this response may then be associated with the particular word the person was reading. This association of a particular word and bioresponse may then be analyzed.

Bioresponse data may be used for a variety of purposes ranging from general research to improving viewer interaction with text, websites, or other multimedia information. In some instances, eye-tracking data may be used to monitor a reader's responses while reading text. The bioresponse to the text may then be used to improve the reader's interaction with the text by, for example, providing definitions of words that the user appears to have trouble understanding.

Bioresponse data may be collected from a variety of devices and sensors that are becoming more and more prevalent today. Laptops frequently include microphones and high-resolution cameras capable of monitoring a person's facial expressions, eye movements, or verbal responses while viewing or experiencing media. Cellular telephones now include high-resolution cameras, proximity sensors, accelerometers, and touch-sensitive screens (galvanic skin response) in addition to microphones and buttons, and these "smartphones" have the capacity to expand the hardware to include additional sensors. Moreover, high-resolution cameras are decreasing in cost, making them prolific in a variety of applications ranging from user devices like laptops and cell phones to interactive advertisements in shopping malls that respond to mall patrons' proximity and facial expressions. The capacity to collect biological responses from people interacting with digital devices is thus increasing dramatically.

Interaction with digital devices has become more prevalent concurrently with a dramatic increase in electronic communication such as email, text messaging, and other forms. The bioresponse data available from some modern digital devices and sensors, however, has not been used in contemporary user interfaces for text parsing and annotation. Typical contemporary parser and annotation mechanisms use linguistic and grammatical frameworks that do not involve the user physically. Also, contemporary mechanisms often provide information regardless of whether the composer needs or wants it and, thus, are not customized to the user.

There is therefore a need and an opportunity to improve the relevance, timeliness, and overall quality of the results of parsing and annotating text messages using bioresponse data.

BRIEF SUMMARY OF THE INVENTION

In one exemplary embodiment, a context-enriched text message may be sent. A text message input by a user may be displayed to the user. Eye-tracking data from the user may indicate an expectation associated with a portion of the text message. The expectation may cause information related to the portion of the text message to be associated with the portion of the message.

In another exemplary embodiment, a text message may be sent according to a method that induces an expectation in the user and measures a bioresponse from the user to the expectation. When it is determined that the bioresponse exceeds a threshold, the expectation may be realized, and information related to a portion of the text message associated with the bioresponse may be associated with the portion of the text message.

DETAILED DESCRIPTION OF THE INVENTION

Figure 1:
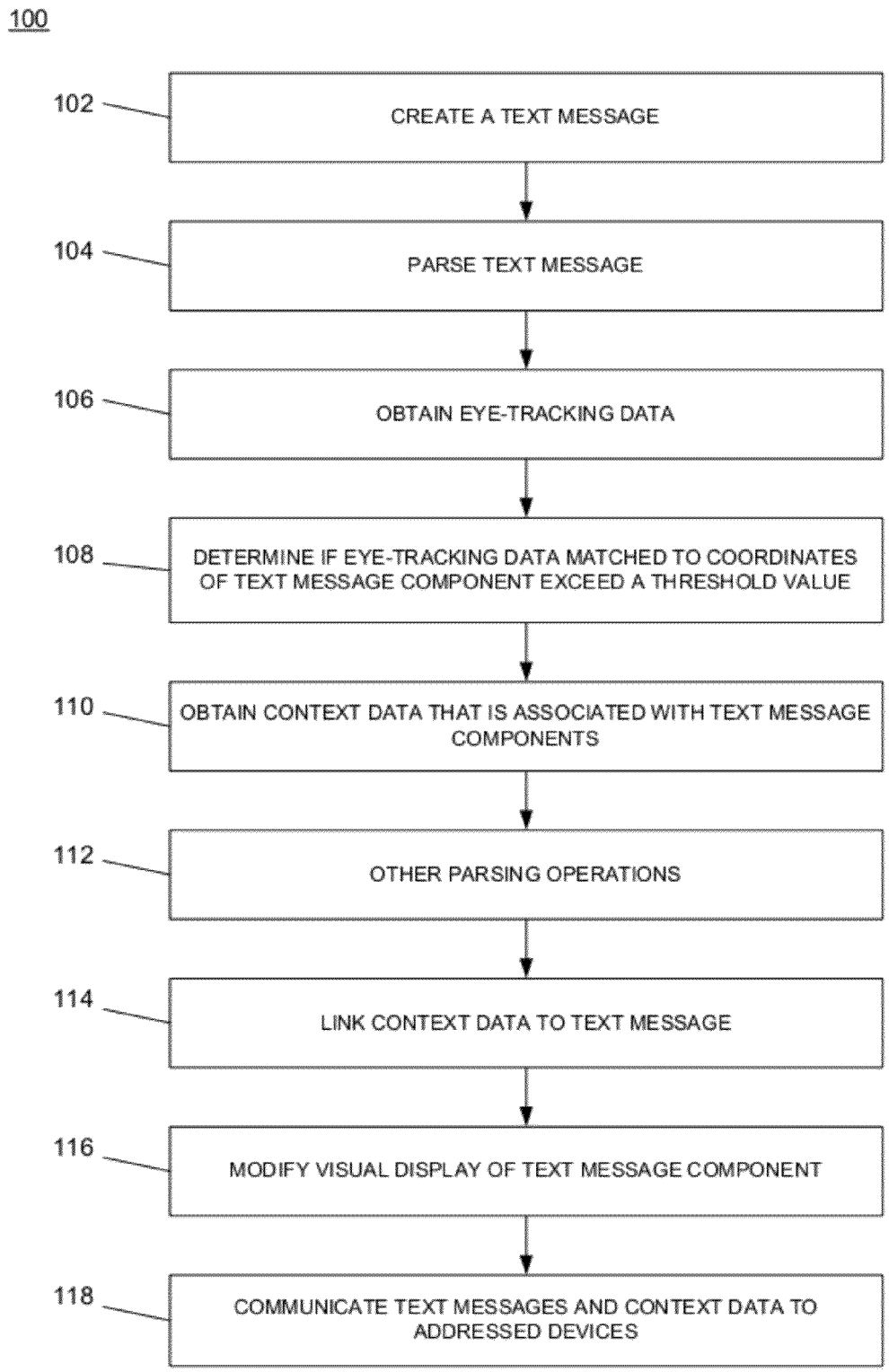
FIG. 1 illustrates an exemplary process for determining context data to link to a text message.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

This disclosure describes techniques that may collect bioresponse data from a user while text is being composed, adjust the level of parsing and annotation to user preferences, comprehension level, and intentions inferred from bioresponse data, and/or respond dynamically to changes in user thought processes and bioresponse-inferred states of mind.

Bioresponse data may provide information about a user's thoughts that may be used during composition to create an interactive composition process. The composer may contribute biological responses (e.g., eye-tracking saccades, fixations, or regressions) during message composition. These biological responses may be tracked, the utility of additional information to the user may be validated, and system responses (e.g., parsing/linguistic frameworks, annotation creation, and display) may be determined. This interaction may result in a richer mechanism for parsing and annotation, and a significantly more dynamic, timely, customized, and relevant system response.

Process Overview

Disclosed are a system, method, and article of manufacture for causing an association of information related to a portion of a text message with the identified portion of the message. Although the present embodiments have been described with reference to specific example embodiments, it will be evident that various modifications and changes may be made to these embodiments without departing from the broader spirit and scope of the various claims.

Biological responses may be used to determine the importance of a word or a portion of a text message. A word may be a "filler" word in some contexts, but could be an "information-laden" word in others. For example, the word "here" in the sentence "Flowers were here and there" is an idiom which connotes a non-specific place (e.g., something scattered all over the place), and has no implication of specific follow-through information. Conversely, in the sentence "Meet me here," the word "here" has a specific implication of follow-through information.

One aspect of this disclosure is that the user's bioresponses may reflect which words are filler-words and which are "information-heavy" words. For example, if a word is a filler word, the user is likely to "gloss" over it, e.g., have a compressed fixation duration of eye movement associated with it. On the other hand, if the word may be information-laden, the user's bioresponses may reflect that expectation of further, relevant information being attached to the "information-heavy" word by having an extended fixation on the word.

FIG. 1 illustrates an exemplary process 100 for linking context data to information-heavy portions of a text message. Process 100 may be used to generate and transmit a context-enriched text message to a text-messaging application in another device.

In step 102, a text message may be created. For example, a text-messaging application of a mobile device may be used to create the text message.

In step 104, the text message may be parsed to identify text message components (i.e., portions of the text message). The coordinate locations of the text message components on the visual display may be obtained. Optionally, a text message component may be matched to a context-data type such that the context data is related to the meaning of the text-message component. Example context-data types may include temperature, location, time, product information, or the like. For example, the word "here" may be matched with location data and the word "this" may be matched with product data. Some text-message components may not have a meaning that matches to an available context-data type. For example, the word "the" may not have a match.

In step 106, eye-tracking data of a user viewing the text message may be obtained. Examples of eye-tracking data may include eye motion patterns while viewing the text message such as fixations, saccades, regressions, or the like. Step 106 may be performed with an eye-tracking system (e.g., a user-facing camera, or the like) in the mobile device to associate eye-tracking data to a text-message component. For example, eye-tracking data may indicate a fixation on a certain area of the display that is mapped to the text message component, one or more regressions to a certain coordinate of the display that is mapped to the text message component, or the like. Exemplary eye-tracking systems are explained further in the descriptions of FIGS. 2-3.

In step 108, it may be determined if eye-tracking data associated with a text-message component exceed a certain threshold value. The threshold value may depend on the particular type of eye movement. For example, a fixation may exceed a specified duration (e.g., a time period such as 750 ms, 2 seconds, or the like), there may be multiple fixations within a certain period (e.g., three regressions to a certain display coordinate within 3.5 seconds), or the like. The association criteria may require that the eye-tracking data exceed one or more threshold conditions, such as a combination of fixation duration and regressions.

In step 110, for text message components with eye-tracking data that exceed a threshold, context data associated with the text-message component may be obtained. As mentioned before, context data may include time, temperature, location, product, or any other data that may be related to the text-message component. Context data may originate from various sources. In some embodiments, exceeding a threshold may initiate an operation to obtain context data from a sensor. For example, the context data may be obtained from a sensor of the mobile device, a sensor in the proximity of the mobile device, the sensors of other mobile devices coupled with the mobile device by a wireless network, or the like. The sensor may obtain a measurement of an environmental attribute that is matched to the term such as location, time, temperature, or the like. In some example embodiments, the context data may be pre-obtained and stored in the memory of the mobile device to be matched to text terms at a later time.

In step 112, other parsing operations may be performed. For example, lexical analysis and/or semantic analysis of the text message may be implemented to determine a meaning of the text-message component. A table may be generated by obtaining meanings of terms in a text message and identifying context-data types that are relevant to a particular meaning. In this way, the context-data type may be determined by the meaning of the text term. If multiple meanings are present, and eye-motion data indicate a user interest, the user may be queried to manually choose one of the meanings. If context data are not available (e.g., the mobile device does not include a relevant sensor), the display of the text may not be modified, and/or a message may be displayed indicating the non-availability of the context data.

In step 114, the context data may be linked to the text-message component. For example, the context data may be appended to the text message. In another example, the context data may be transmitted to a server where the data are available via a hyperlink that is appended to the text message. In another example, a textual description, iconic representation, or the like of the context data may be generated and included in the text message.

Context data may include any data, metadata, or the like that may be linked to the text message. For example, alternative context data may be provided. Consider the text message "Meet me here." In this example, context data may be available for "here." "Here" may indicate the street corner, the shop on the street corner, or the restaurant across the street. The text message may show that there are multiple alternatives to be linked to the word "here," and allow the user to select which linkage is desired. In one embodiment, the color of the context data may provide further information, such as the strength or relevancy of a proposed linkage, the number of available linkages, or the like. For example, one color, font type, font style, or the like may indicate that there is only one available linkage, while another color, font type, font style, or the like may indicate that there are several available linkages. The invention is not limited to these embodiments and other types of context data may be used, such as, but not limited to, the strength of the association, alternative associations, the availability of alternative associations, or the like.

In step 116, the visual display of the text message component may be modified to indicate that the context data has been linked to the text message. For example, the color of the text-message component may be modulated to a different color than the rest of the text message. The text may also be modified in other ways such as by changing the font, underlining, bolding, adding an icon, or the like.

Figure 9:
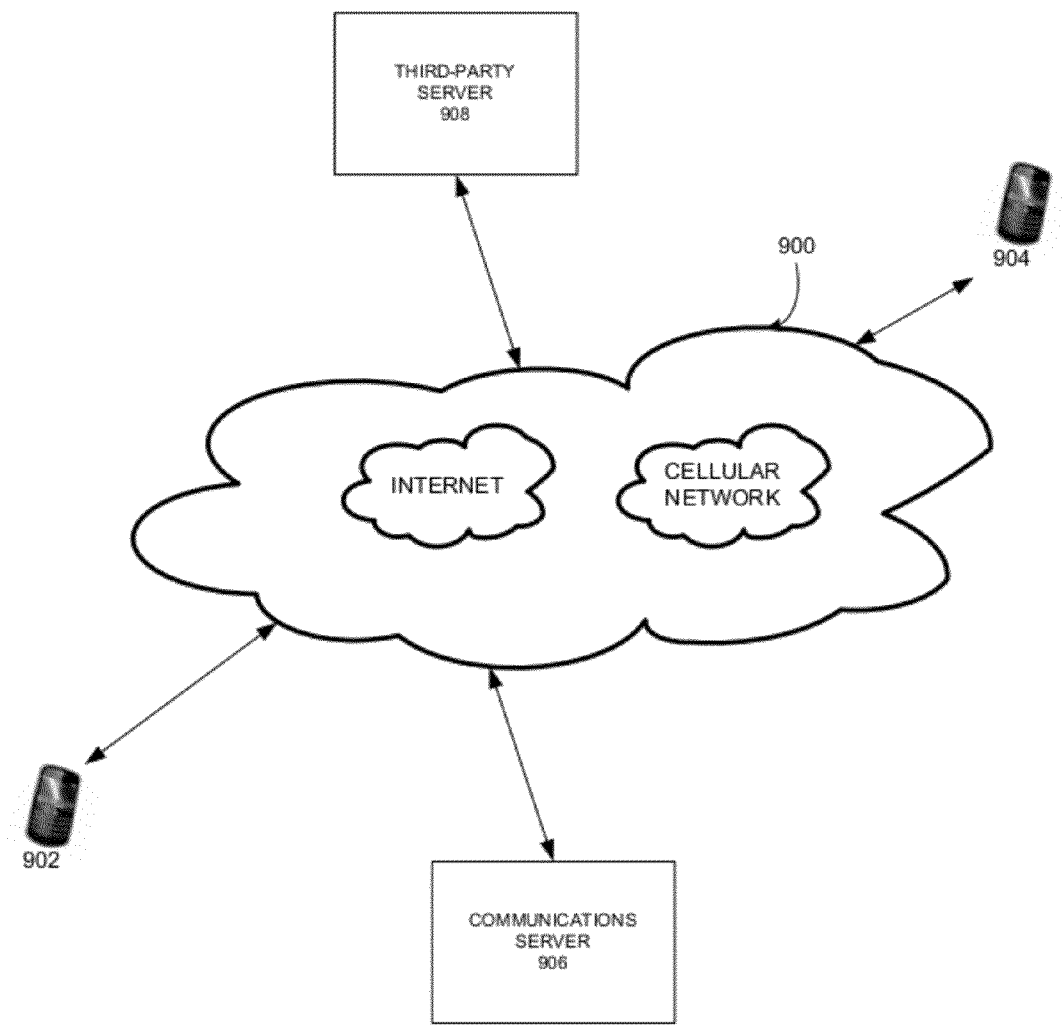
FIG. 9 is a system view of a messaging service, according to some embodiments.
Figure 10:
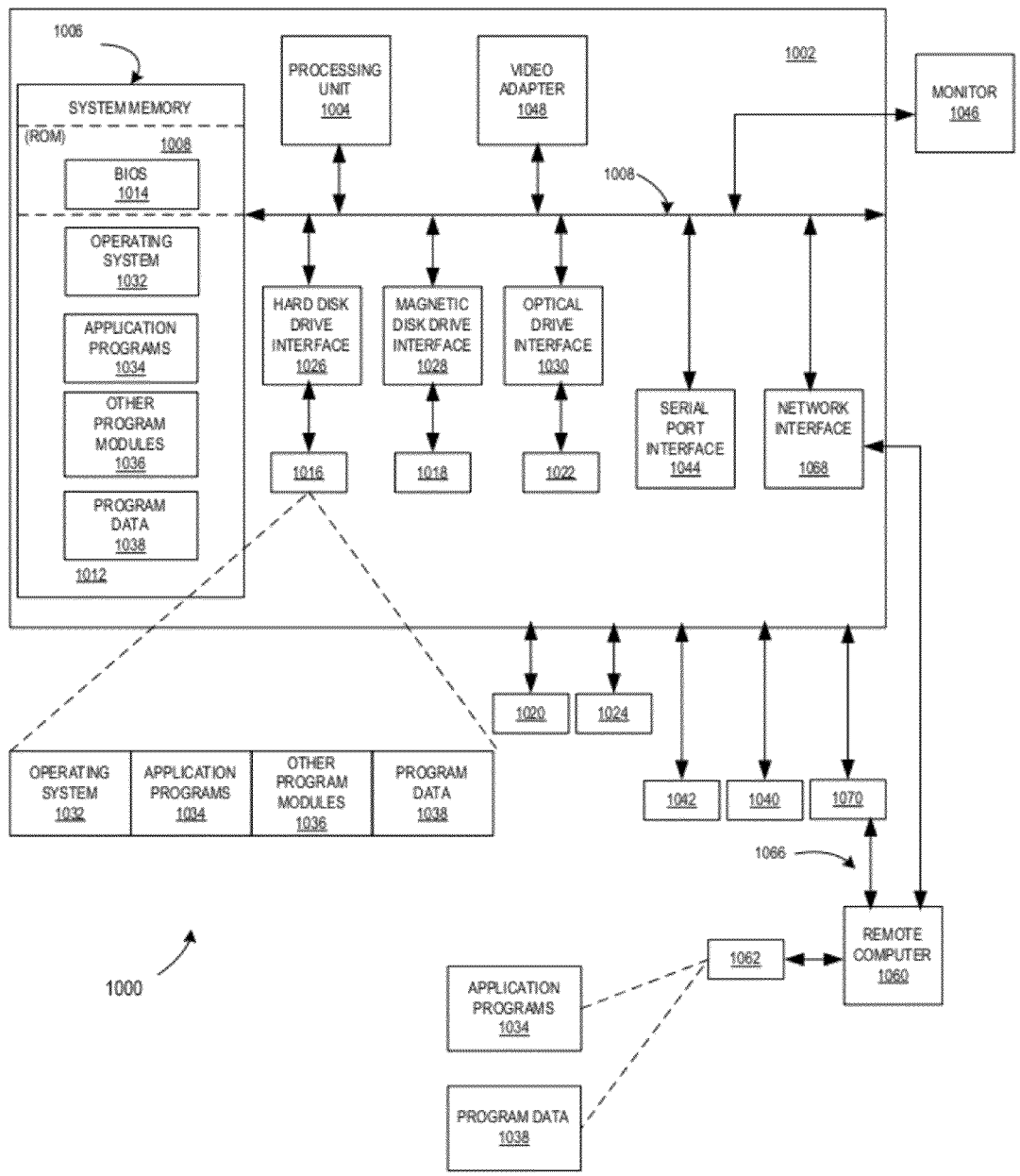
FIG. 10 illustrates an exemplary system environment for implementing various aspects of the invention.
Figure 11:
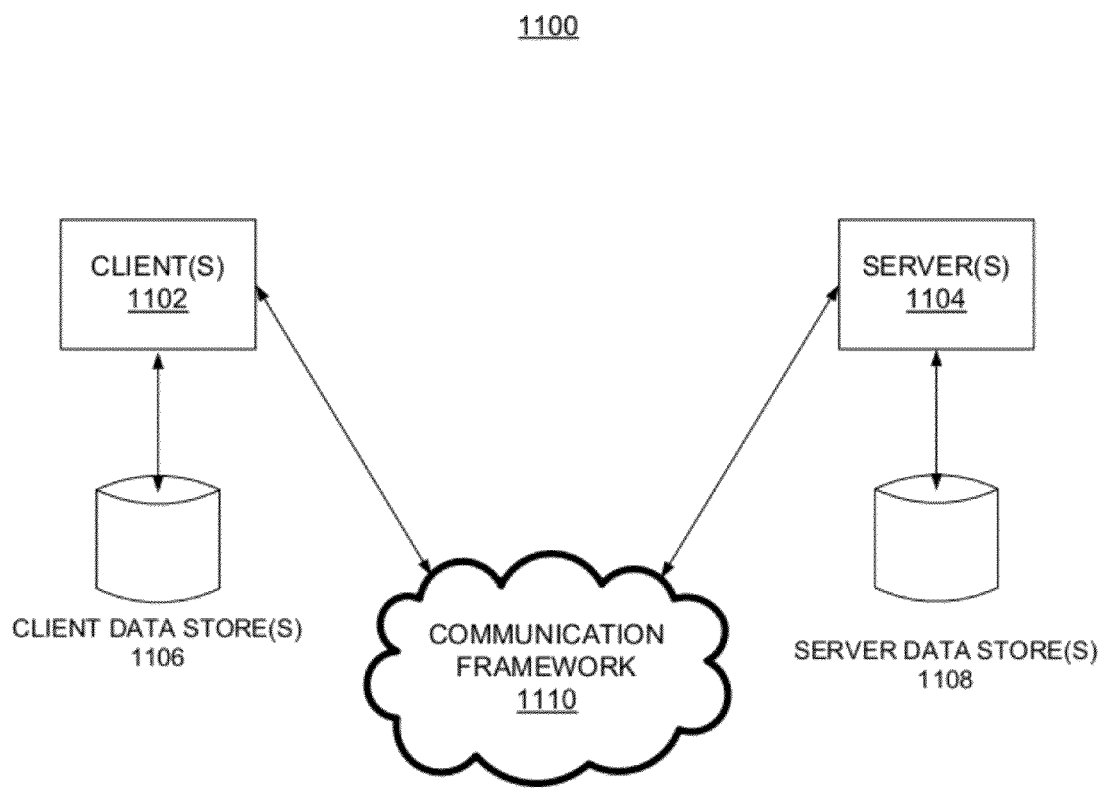
FIG. 11 is another block diagram of a sample computing environment.

In step 118, the text message and the context data may be communicated to addressed devices. Optionally, the text message and context data may be sent as a context-enriched text message. The text message and context data may be communicated via a communication network such as the networks illustrated in FIG. 9 and FIG. 11. Exemplary systems, devices, and functionalities implementing process 100 are illustrated in FIGS. 9-11.

In some embodiments, process 100 may be integrated with other parsing and lexical/semantical analysis processes to determine context data to link to text message components. Additionally, in certain embodiments, the steps of process 100 may be performed in another order and/or multiple times. For example, other parsing operations (step 112) may be performed immediately after parsing the text message (step 104), or one may obtain context data for certain words (step 110) before obtaining eye-tracking data (step 106). As another example, steps 106, 108, and 116 may be performed multiple times in an iterative process before linking context data to a text message (step 114) and communicating text message and context data to addressed devices (step 118).

Alternatively, steps may be omitted from or added to process 100 without straying from the scope of the claims. For example, in some embodiments, other parsing operations (step 112) may be omitted, or the visual display of the text message component may not be modified (step 116). If the visual display of the text component is not modified, other indicators such as sounds or vibrations may alert the user when context data are linked to a text message. Also, additional steps may be incorporated into process 100, such as obtaining or using other types of bioresponse data, or storing obtained eye-tracking or context data for use at a later time.

The following sections provide further description and exemplary embodiments of selected steps of the described process.

Receive Bioresponse Data

In step 106 of process 100, eye-tracking data may be obtained. More generally, when a user is viewing data on a user device, bioresponse data may be collected. The viewed data may take the form of a text message, webpage element, instant message, email, social networking status update, micro-blog post, blog post, video, image, or any other digital document. The bioresponse data may be eye-tracking data, heart rate data, hand pressure data, galvanic skin response data, or the like. A webpage element may be any element of a webpage document that is perceivable by a user with a web browser on the display of a computing device.

Figure 2:
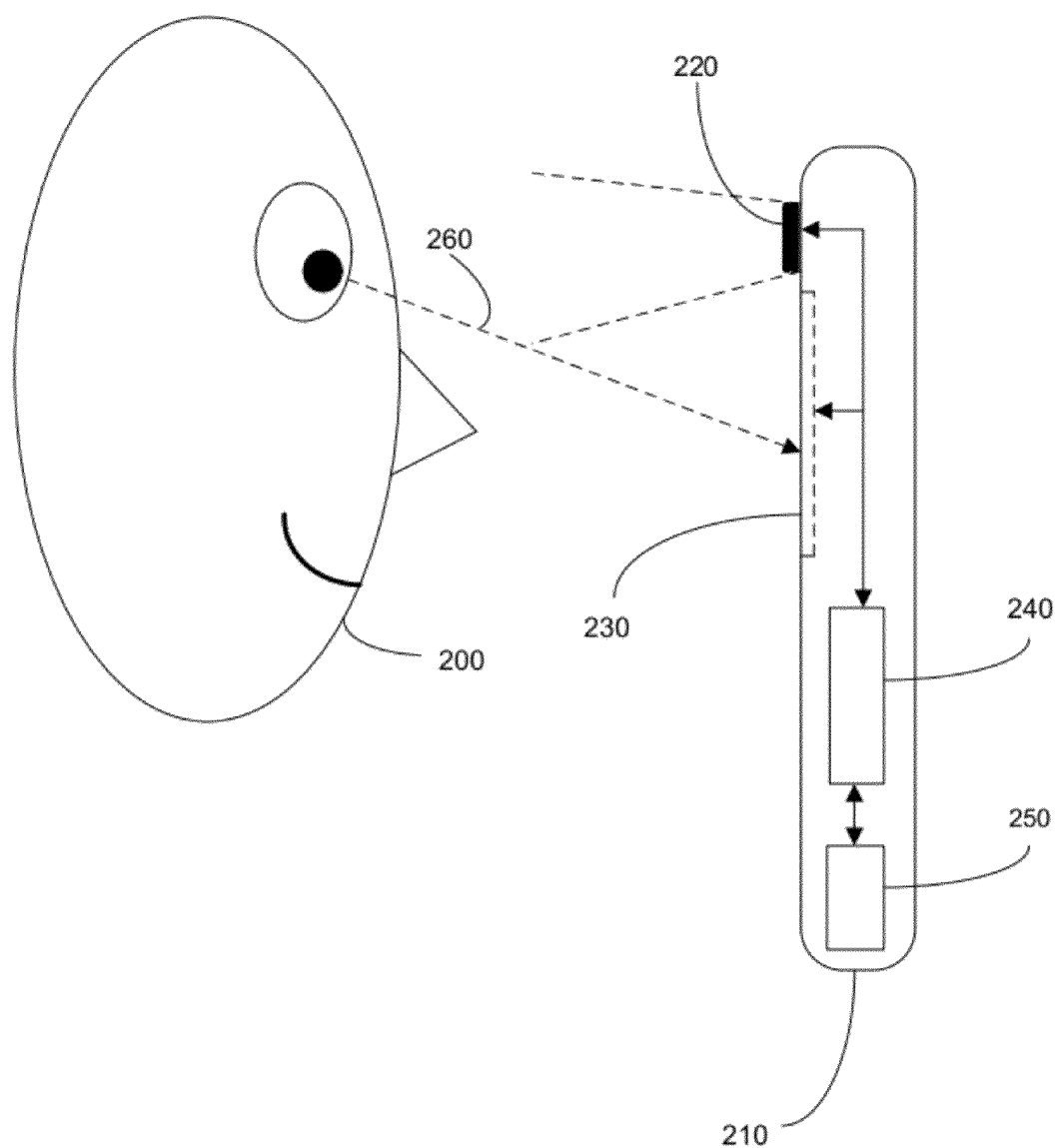
FIG. 2 illustrates an example of an eye-tracking module of a tablet computer to track the gaze of a user.

FIG. 2 illustrates one example of obtaining bioresponse data from a user viewing a digital document, such as a text message. In this embodiment, eye-tracking module 240 of user device 210 tracks the gaze 260 of user 200. Although illustrated here as a generic user device 210, the device may be a cellular telephone, personal digital assistant, tablet computer (such as an iPad®), laptop computer, desktop computer, or the like. Eye-tracking module 240 may utilize information from at least one digital camera 220 and/or an accelerometer 250 (or similar device that provides positional information of user device 210) to track the user's gaze 260. Eye-tracking module 240 may map eye-tracking data to information presented on display 230. For example, coordinates of display information may be obtained from a graphical user interface (GUI). Various eye-tracking algorithms and methodologies (such as those described herein) may be used to implement the example shown in FIG. 2.

In some embodiments, eye-tracking module 240 may use an eye-tracking method to acquire the eye movement pattern. In one embodiment, an example eye-tracking method may include an analytical gaze estimation algorithm that employs the estimation of the visual direction directly from selected eye features such as irises, eye corners, eyelids, or the like to compute a gaze 260 direction. If the positions of any two points of the nodal point, the fovea, the eyeball center, or the pupil center can be estimated, the visual direction may be determined.

In addition, a light may be included on the front side of user device 210 to assist detection of any points hidden in the eyeball. Moreover, the eyeball center may be estimated from other viewable facial features indirectly. In one embodiment, the method may model an eyeball as a sphere and hold the distances from the eyeball center to the two eye corners to be a known constant. For example, the distance may be fixed to 13 mm. The eye corners may be located (e.g., by using a binocular stereo system) and used to determine the eyeball center. In one exemplary embodiment, the iris boundaries may be modeled as circles in the image using a Hough transformation.

The center of the circular iris boundary may then be used as the pupil center. In other embodiments, a high-resolution camera and other image processing tools may be used to detect the pupil. It should be noted that, in some embodiments, eye-tracking module 240 may utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate gaze 260 direction using stereo vision, a free head motion remote eyes (REGT) technique, or the like. Additionally, any combination of any of these methods may be used.

Figure 3:
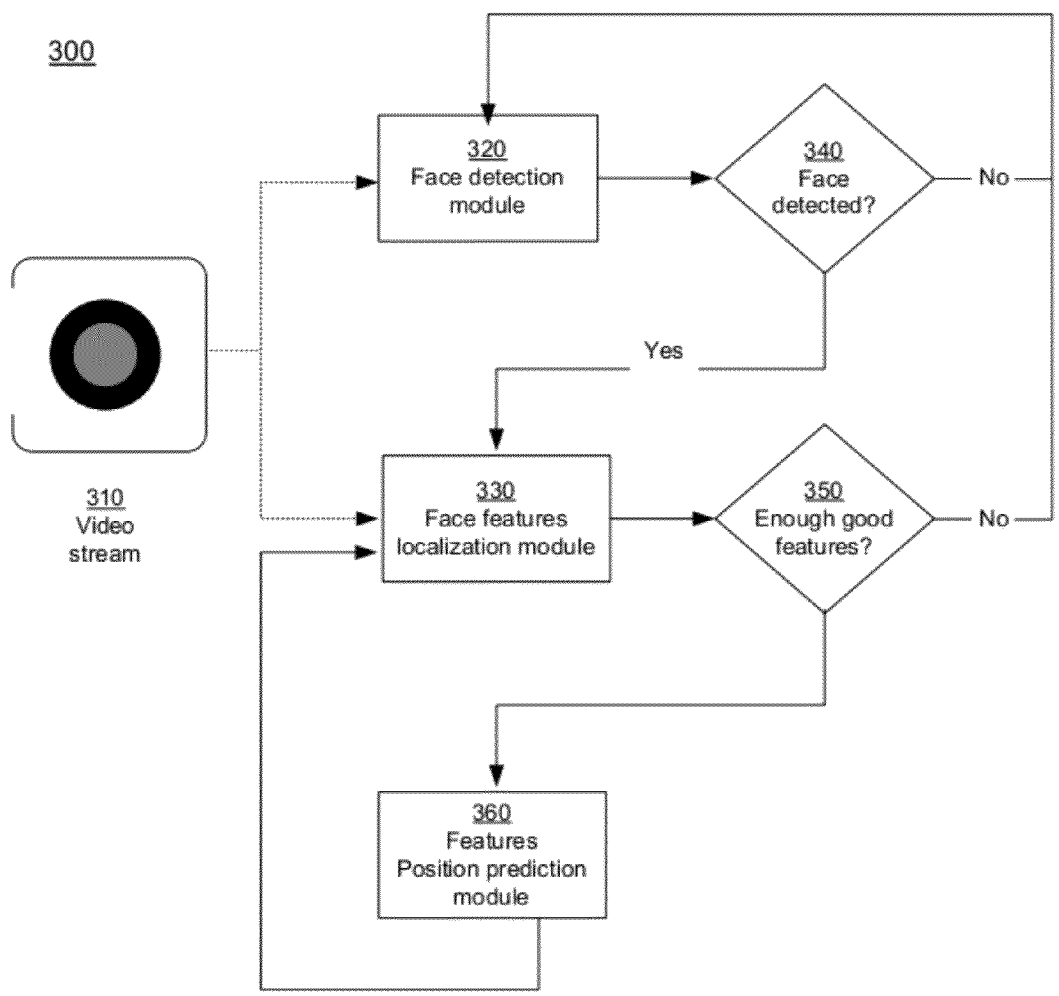
FIG. 3 illustrates exemplary components and an exemplary process for detecting eye-tracking data.

FIG. 3 illustrates exemplary components and an exemplary process 300 for detecting eye-tracking data. The gaze-tracking algorithm discussed above may be built upon three modules which interoperate to provide a fast and robust eyes and face-tracking system. Data received from video stream 310 may be input into face detection module 320 and face feature localization module 330. Face detection module 320, at junction 340, may check whether a face is present in front of the camera, receiving video stream 310.

In the case that a face is present, face detection module 320 may determine a raw estimate of the 2D position in the image of the face and facial features (e.g., eyebrows, eyes, nostrils, and mouth) and provide the estimate to face features localization module 330. Face features localization module 330 may find the exact position of the features. When the feature positions are known, the 3D position and orientation of the face may be estimated. In one embodiment, the 3D position and orientation may be estimated based on the method of Jeremy Y. Kaminski, Adi Shavit, Dotan Knaan, Mina Teicher, "Head Orientation and Gaze Detection from a Single Image," *Proceedings of International Conference of Computer Vision Theory and Applications* (2006), herein incorporated by reference. Gaze direction may be processed by combining face orientation estimation and a raw estimate of eyeball orientation processed from the iris center position in the eyes (Jie Zhu, Jie Yang, "Subpixel Eye Gaze Tracking," *Fifth IEEE International Conference on Automatic Face and Gesture Recognition* (2002), herein incorporated by reference).

If a face is not detected, control passes back to face detection module 320. If a face is detected but not enough facial features are detected to provide reliable data at junction 350, control similarly passes back to face detection module 320. Module 320 may try again after more data are received from video stream 310. Once enough good features have been detected at junction 350, control passes to feature position prediction module 360. Feature position prediction module 360 may process the position of each feature for the next frame. This estimate may be built using Kalman filtering on the 3D positions of each feature. The estimated 3D positions may then be back-projected to the 2D camera plane to predict the pixel positions of all the features. Then these 2D positions may be sent to face features localization module 330 to help it process the next frame.

The eye-tracking method is not limited to this embodiment. Any eye-tracking method may be used. For example, in another embodiment, the hardware setup may be used as described in Fabian Fritzer, Detlev Droege, Dietrich Paulus, "Gaze Tracking with Inexpensive Cameras," *Proceedings of the First Conference on Communication by Gaze Interaction* (2005), herein incorporated by reference. The hardware setup may consist of a high-sensitivity black and white camera (using, e.g., a Sony EXView HAD CCD chip), equipped with a simple NIR filter letting only NIR wavelengths pass and a set of IR-LEDs to produce a corneal reflection on the user's cornea. The IR-LEDs may be positioned below instead of beside the camera. This positioning avoids shadowing the opposite eye by the user's nose and thus supports the usage of reflections in both eyes. To test different distances between the camera and the user, the optical devices may be mounted on a rack. In some embodiments, only three of the nine IR-LEDs mounted on the rack are used, as they already provide sufficient light intensity to produce a reliably detectable reflection on the cornea. One example of an implementation of this embodiment uses the OpenCV library that is available for Windows™ and Linux platforms. Machine-dependent parts may be encapsulated so that the program may be compiled and run on both systems.

When implemented using the OpenCV library, if no previous eye position from preceding frames is known, the input image may first be scanned for possible circles using an appropriately adapted Hough algorithm. To speed up operation, an image of reduced size may be used in this step. In one embodiment, limiting the Hough parameters (e.g., the radius) to a reasonable range determines the eye position more quickly. Next, the detected candidates may be checked against further constraints like a suitable distance between the pupils and a realistic roll angle between them. If no matching pair of pupils is found, the image may be discarded. For successfully matched pairs of pupils, sub-images around the estimated pupil center may be extracted for further processing. Especially due to interlace effects, but also caused by other influences the pupil center coordinates, pupils found by the initial Hough algorithm may not be sufficiently accurate for further processing. For exact calculation of gaze 260 direction, however, this coordinate should be as accurate as possible.

One possible approach for obtaining a usable pupil center estimation is actually finding the center of the pupil in an image. However, the invention is not limited to this embodiment. In another embodiment, for example, pupil center estimation may be accomplished by finding the center of the iris, or the like. While it provides a larger structure and thus higher stability for the estimation, the iris is often partly covered by the eyelid and thus not entirely visible. Also, its outer bound does not always have a high contrast to the surrounding parts of the image. The pupil, however, may be easily spotted as the darkest region of the (sub-)image.

Using the center of the Hough-circle as a base, the surrounding dark pixels may be collected to form the pupil region. The center of gravity for all pupil pixels may be calculated and considered to be the exact eye position. This value may also form the starting point for the next cycle. If the eyelids are detected to be closed during this step, the image may be discarded. The radius of the iris may now be estimated by looking for its outer bound. This radius may later limit the search area for glints. An additional sub-image may be extracted from the eye image, centered on the pupil center and slightly larger than the iris. This image may be checked for the corneal reflection using a simple pattern matching approach. If no reflection is found, the image may be discarded. Otherwise, the optical eye center may be estimated and the gaze 260 direction may be calculated. It may then be intersected with the monitor plane to calculate the estimated viewing point. These calculations may be done for both eyes independently. The estimated viewing point may then be used for further processing. For instance, the estimated viewing point may be reported to the window management system of a user's device as mouse or screen coordinates, thus providing a way to connect the eye-tracking method discussed herein to existing software.

A user's device may also include other eye-tracking methods and systems such as those included and/or implied in the descriptions of the various eye-tracking operations described herein. In one embodiment, the eye-tracking system may include an external system (e.g., a Tobii T60 XL eye tracker, Tobii TX 300 eye tracker or similar eye-tracking system) communicatively coupled (e.g., with a USB cable, with a short-range Wi-Fi connection, or the like) with the device. In other embodiments, eye-tracking systems may be integrated into the device. For example, the eye-tracking system may be integrated as a user-facing camera with concomitant eye-tracking utilities installed in the device.

In one embodiment, the specification of the user-facing camera may be varied according to the resolution needed to differentiate the elements of a displayed message. For example, the sampling rate of the user-facing camera may be increased to accommodate a smaller display. Additionally, in some embodiments, more than one user-facing camera (e.g., binocular tracking) may be integrated into the device to acquire more than one eye-tracking sample. The user device may include image processing utilities necessary to integrate the images acquired by the user-facing camera and then map the eye direction and motion to the coordinates of the digital document on the display. In some embodiments, the user device may also include a utility for synchronization of gaze data with data from other sources, e.g., accelerometers, gyroscopes, or the like. In some embodiments, the eye-tracking method and system may include other devices to assist in eye-tracking operations. For example, the user device may include a user-facing infrared source that may be reflected from the eye and sensed by an optical sensor such as a user-facing camera.

Figure 4:
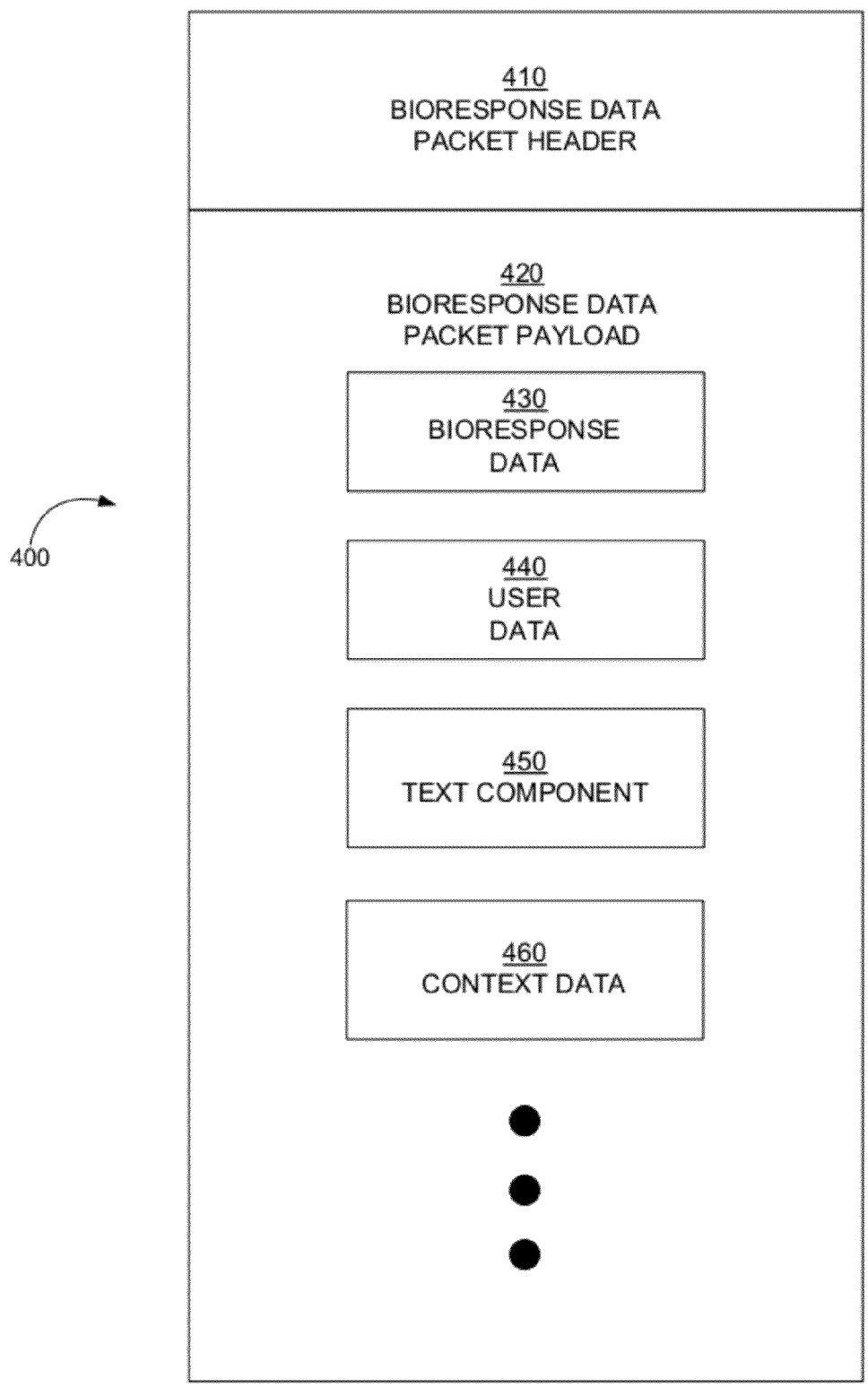
FIG. 4 illustrates an example of a bioresponse data packet.

Irrespective of the particular eye-tracking methods and systems employed, and even if bioresponse data other than eye-tracking is collected for analysis, the bioresponse data may be transmitted in a format similar to the exemplary bioresponse data packet 400 illustrated in FIG. 4. The bioresponse data packet 400 may include a header 410 and payload 420. Bioresponse data packet payload 420 may include bioresponse data 430 (e.g., GSR data, eye-tracking data, hand-pressure data, accelerometer data, voice-inflection data, or the like, and/or any combination thereof), user data 440, a text component 450, and context data 460. User data 440 may include data that map bioresponse data 430 to text component 450. However, the invention is not limited to this embodiment. For example, user data 440 may include user input data such as name, age, gender, hometown, or the like. User data 440 may also include device information regarding the global position of the device, temperature, pressure, time, or the like. Bioresponse data packet payload 420 may also include context data 460 with which the text component is mapped. For example, context data may include digital media content and metadata about digital media content such as source, timestamp, other users who have downloaded it, and the like, depending on the type of data packet. Bioresponse data packet 400 may be formatted and communicated according to an IP protocol. Alternatively, bioresponse data packet 400 may be formatted for any communication system, including, but not limited to, an SMS, EMS, MMS, or the like. In some example embodiments, some types of data may not be included in data packet 400. For example, text component 450 and context data 460 may be included while bioresponse data 430 may not be included.

Training the User

As illustrated in steps 102 and 104 of FIG. 1, in some embodiments, a text message may be created and parsed. After parsing, it may be possible to associate context data with certain terms in the text message. The user may be informed that the text of these terms may be modified (e.g., a slight color change) if context data is associated with the term. In this way, a user's gaze may be prompted to focus attention on the subset of terms that have available context data, and a user may be trained to link the context data to the term.

Figure 5:
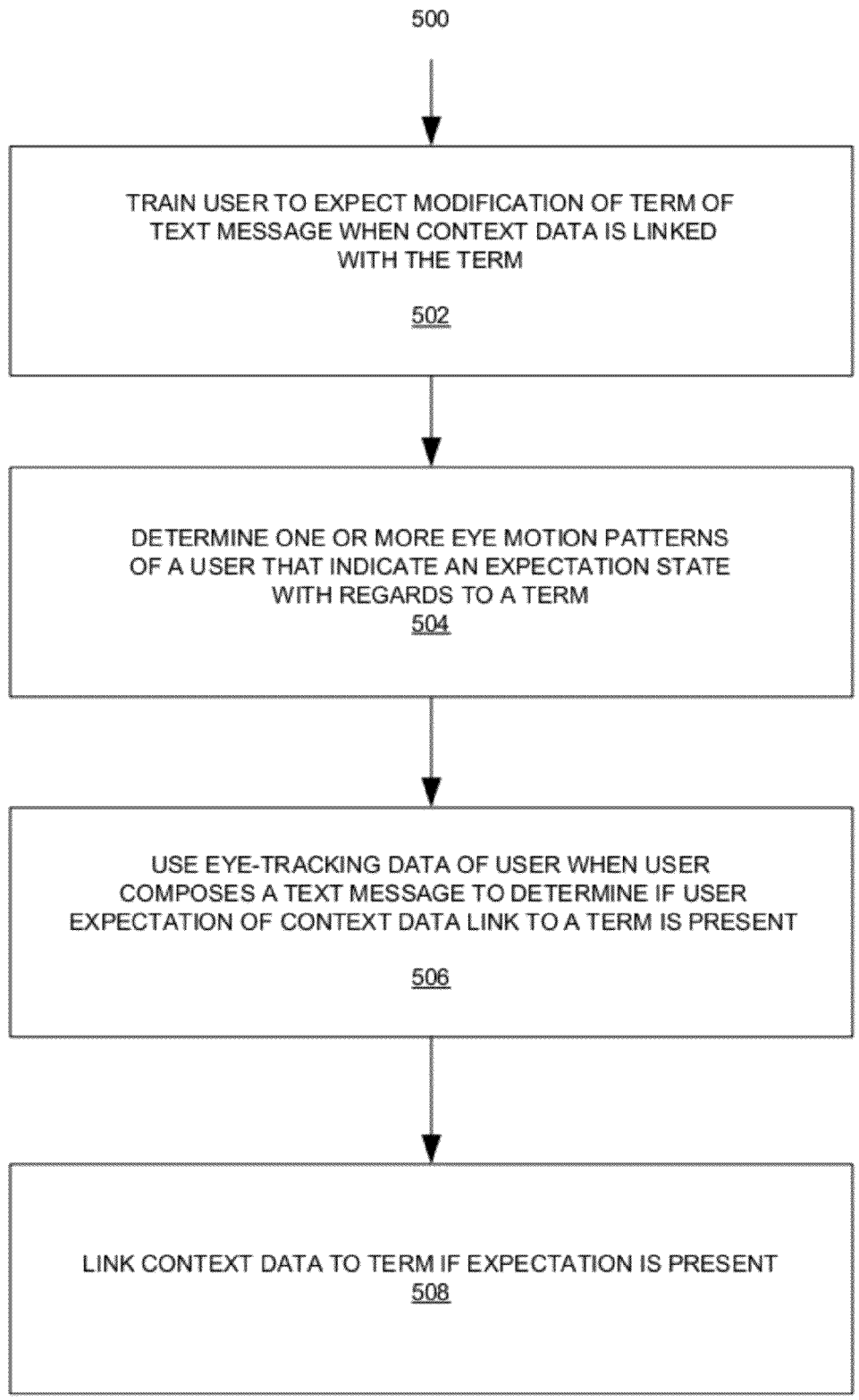
FIG. 5 illustrates an exemplary process for generating a context-enriched text message.

FIG. 5 illustrates an exemplary process 500 for generating a context-enriched text message by training. In step 502 a user is trained to expect the modification of a term of a text message when context data are linked to the text message. The user may expect the modification to occur "automatically," without the user's conscious input. For example, a user may be trained that certain terms may automatically link to certain types of context data (e.g., a measurement of an environmental attribute of the user's mobile device as obtained by a sensor). In addition, the eye-tracking system in the user's mobile device may acquire the user's eye-tracking data. The eye-tracking data may be used to determine if the user's expectation is present or not. For example, if the user expects a term to be modified, the eye-tracking data may indicate a fixation on the term for a threshold period, a certain number of regressions to the term, or the like. In one example, in step 502, a training program may be used to teach the user to associate certain terms with the automatic linking of context data. This may be performed by providing the user with examples. After several examples, the system may perform the automatic linking as expected by the user. In step 504, the eye-tracking system may acquire the user's eye-tracking data and use their metric to determine a threshold value. Machine-learning systems may also be used to compensate for user adaptation to the system over time.

In step 506, the eye-tracking data may be used during composition of a text message to determine if the user expects context data with a particular term. If the expectation is present, appropriate context data may be acquired and linked to the term in step 508.

Determine Significance of Bioresponse Data

Figure 6A:
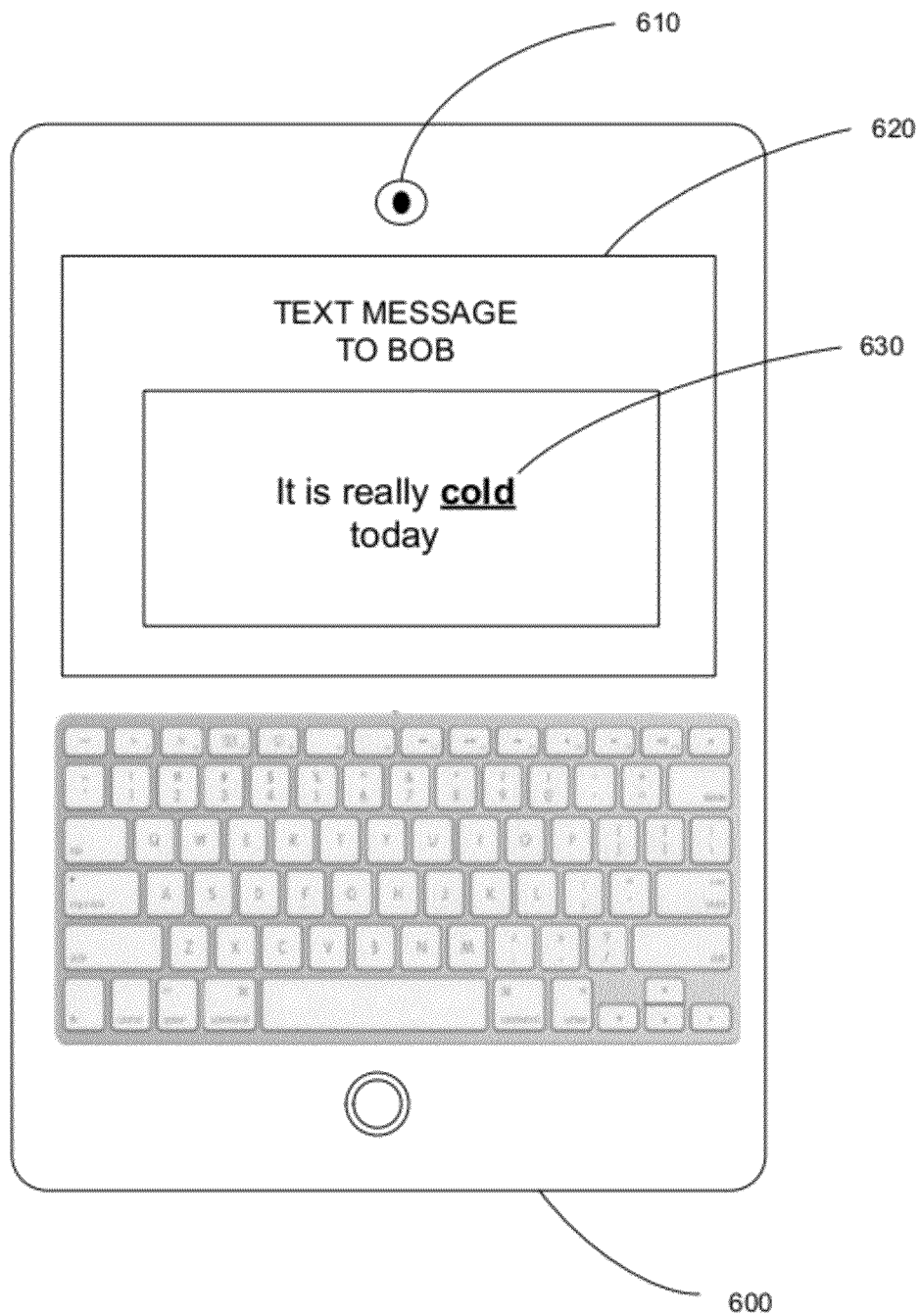
FIGS. 6A-6B depict a display of a mobile device implementing a text-messaging application according to an exemplary embodiment.

In step 108 of FIG. 1, it is determined whether bioresponse data, specifically eye-tracking data, exceed a threshold value. FIG. 6A illustrates a text message on mobile device 600 with the viewer focusing on the text message in visual display component 620. In some embodiments, mobile device 600 may include one or more digital cameras 610 to track eye movements. In one embodiment, mobile device 600 may include at least two stereoscopic digital cameras. Mobile device 600 may also include a light source that can be directed at the eyes of the user to illuminate at least one eye of the user to assist in a gaze detection operation. In some embodiments, mobile device 600 may include a mechanism for adjusting the stereo base distance according to the user's location, distance between the user's eyes, user's head motion, or the like to increase the accuracy of the eye-tracking data. The size of the text message, text message presentation box, or the like may also be adjusted to facilitate increased eye-tracking accuracy.

An example of a text message 630 is presented on the display 620 of mobile device 600. The eye-tracking system may determine that the user's eyes are directed at the display 620. The pattern of the eye's gaze on the display 620 may then be recorded. The pattern may include such phenomena as fixations, saccades, regressions, or the like. In some embodiments, the period of collecting eye-tracking data may be a specified time period. This time period may be calculated based on the length of the message. For example, in one embodiment, the collection period may last a specific period of time per word, such as 0.5 seconds per word. In such an embodiment, for a six-word message, the collection period may last 3 seconds. However, the invention is not limited to this embodiment. One of ordinary skill in the art would understand that different time periods may apply. For example, the collection period may be 0.25 seconds per word, a predetermined period of time, based on an average time to read a message of similar length, or the like. The gaze pattern for a particular time period may thus be recorded and analyzed.

In FIG. 6A, the user has input a text message 630: "It is really cold today." An expectation may be induced in the user that a term will be modified if context data is associated with the term. For example, a user may be told that a term will change color after 5 seconds. Eye-tracking data obtained with the user-facing camera may indicate that the user's gaze pattern with regards to the term "cold" exceeds a specified threshold. For example, in one embodiment, a user may fixate on the term "cold," expecting that the term will change color when the context data is associated with it. After some amount of time (e.g., 3 seconds), it may be recognized that the user expects the term to be modified. Therefore, at the 5 second mark, the term may be modified and context data may be associated with the term. Alternatively, the user's gaze may have made a certain number of regressions to the term "cold," one or more fixations of a certain period on the term, or saccadic patterns related to the term "cold" may have varied compared to the other terms. Optionally, various combinations of fixations, regressions and/or saccades may represent a specified threshold. It should be noted that in some examples, a set threshold of the particular gaze pattern may be used to determine interest. In other examples, interest may be determined by a comparison of gaze patterns among the various terms of the message. For example, a heat map, or similar rendering of gaze pattern over a period such as the period of composition of the text message, may be rendered to determine the greatest term(s) of interest. A term of interest may then be matched to a context-data type. In the particular example of FIG. 6A, the term "cold" is related to the ambient temperature of the mobile device.

Figure 6B:
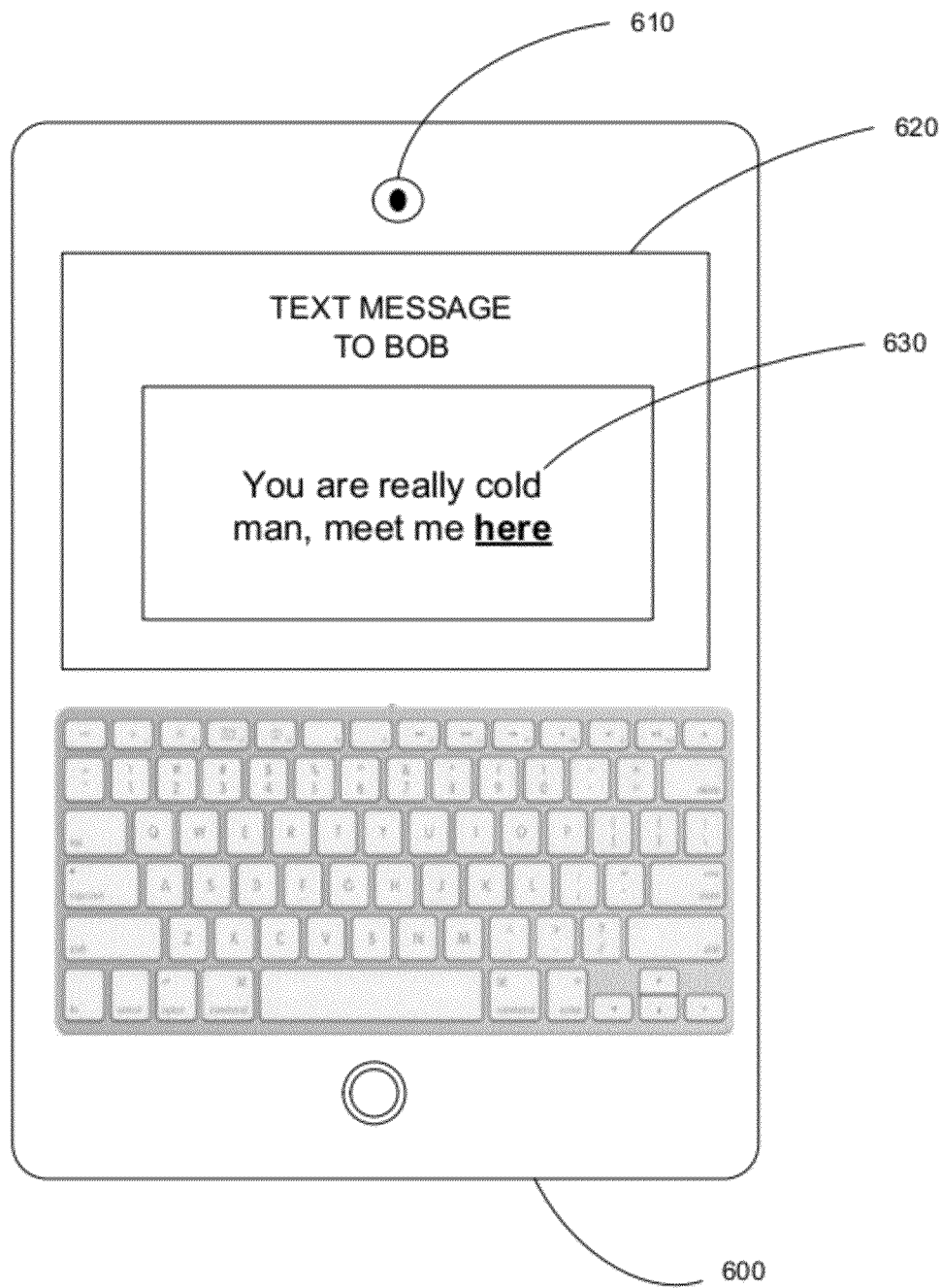

FIG. 6B depicts the display of the mobile device implementing the text messaging application according to an example embodiment. The text message "You are really cold man, meet me here," has been written. Eye-tracking data indicates that the user's interest in the term "cold" does not reach the threshold value for triggering an operation to associate context data, such as temperature, with the term, because the user does not expect temperature context data to be associated with "cold" in this example. Here, "cold" may imply an emotional state rather than a temperature. The user may not be interested in the word, so no threshold pattern may be triggered, unlike the example in FIG. 6A. Therefore, the user does not expect "cold" to be modified and so does not change his/her viewing pattern with respect to the term "cold." Instead, however, eye-tracking data may indicate that the user's eye motions (e.g., regressions, saccadic patterns, fixations, or the like) indicate sufficient interest in the term "here."

Obtaining and Linking Context Data

In step 110 of FIG. 1, context data is obtained. In FIG. 6A, the mobile device may include a sensor that may obtain temperature values for the term "cold." The temperature value may be linked to the term "cold," for example, by appending the value to the text message. The text of the term "cold" may be modified to indicate when the linkage has occurred. Changing color, underlining, adding an icon, altering font, or the like are exemplary ways of indicating a linkage. In some examples, the temperature data may be presented to the user to allow the user to accept the linkage of the temperature data to the term "cold." If the user rejects the linkage, another context-data type may be selected as an alternative. In FIG. 6B, a context-messaging functionality of the mobile device may acquire the user's present location (e.g., with GPS or similar source) and link the location data with the term "here."

Figure 7A:
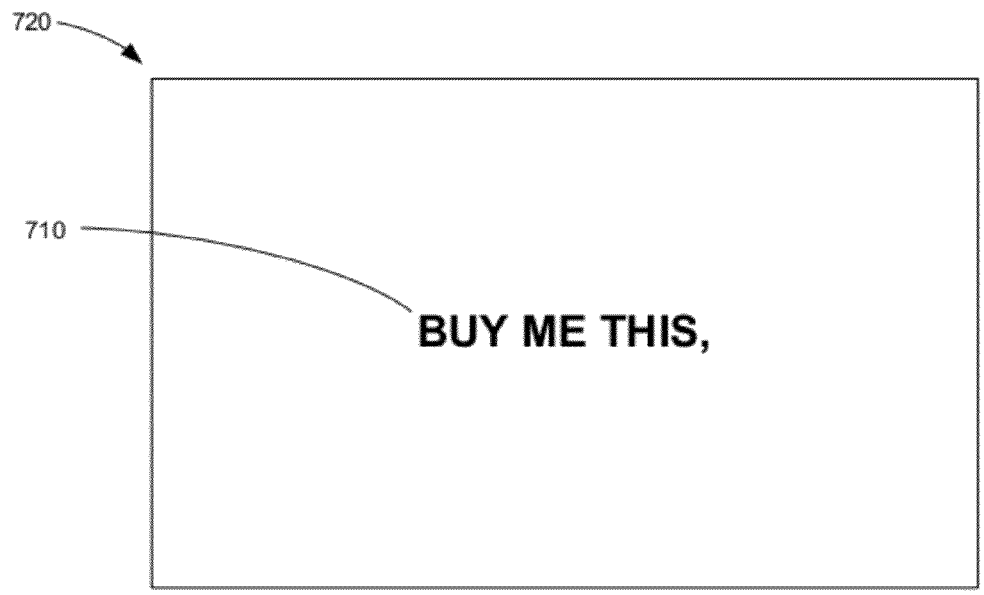
FIG. 7A illustrates an example of a text message presented on a display of a mobile device.
Figure 7B:
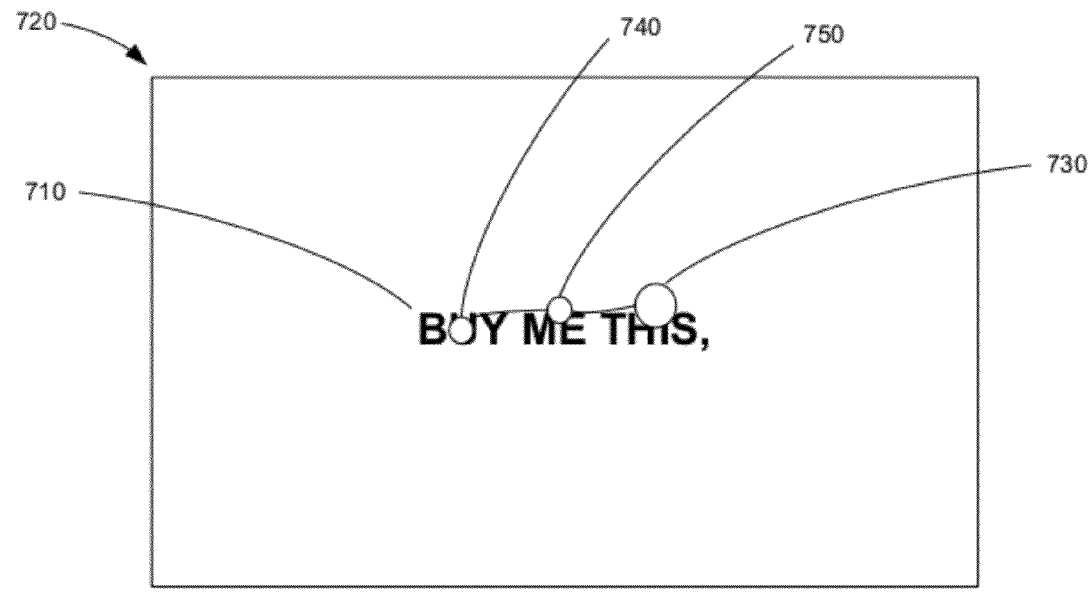
FIG. 7B illustrates eye motion and fixations of the user over the text message of FIG. 7A.

FIG. 7A illustrates an example text message 710 presented on a display 720 of a mobile device, according to some embodiments. FIG. 7B illustrates eye motion and fixations of the user over the text message of FIG. 7A. The size of the circle area is related to duration of the fixation. For example, a user may fixate on the term "this" for longer than the words "buy" or "me," expecting "this" to be modified and associated with context data. In this case, the circle 730 will be larger for the word "this" than the circles 740, 750 for the words "buy" or "me." Eye-tracking data may be obtained with an eye-tracking system integrated with the mobile device. The display may be modified to represent eye-tracking data with the graphical user interface (GUI) in some embodiments. The content of the context-enriched text message may be modified based on the values of eye-tracking events. Optionally, the displayed text may be modified to indicate a hyperlink to the sensor data.

Figure 7C:
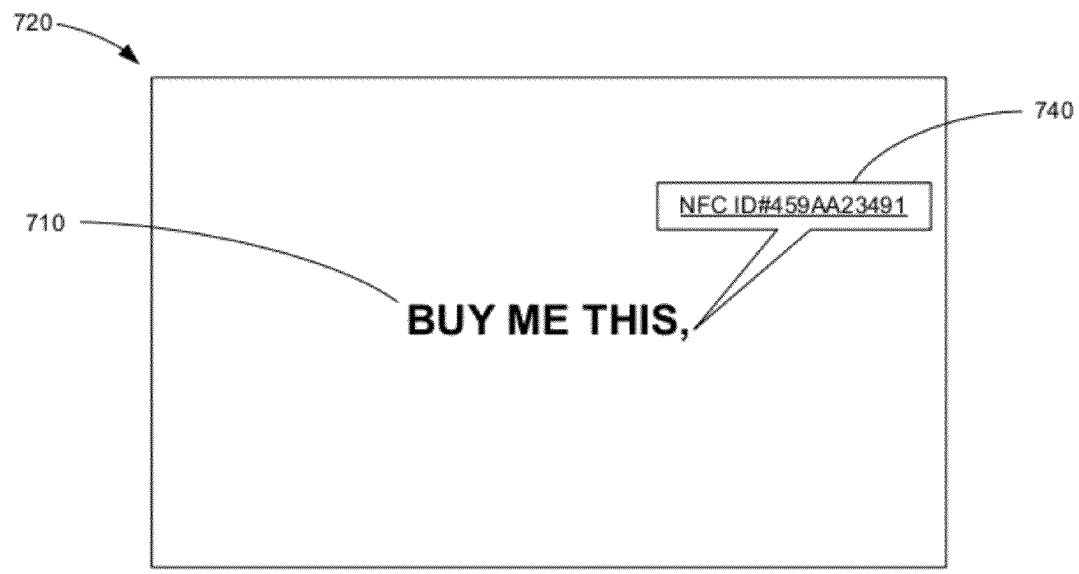
FIG. 7C shows the content of the display being modified.

FIG. 7C shows an example of the content of the display being modified to include an NFC (near-field communication number) 740 associated with an item for purchase from a commercial vendor. In some embodiments, the NFC number may be used to identify the item for purchase. The NFC number may be obtained by an NFC reader of the mobile device used to compose the text message. For example, the user may expect the word "this" to be modified, which causes him or her to look at "this" longer than other words. In response, the device may identify "this" to be a word of interest and determine that it refers to an item to be purchased based on the surrounding words. This may prompt the mobile device to activate its NFC reader to acquire the NFC number and associate it with the word "this." Optionally, the mobile device may also include other utilities that integrate sensor data with text messages.

Figure 7D:
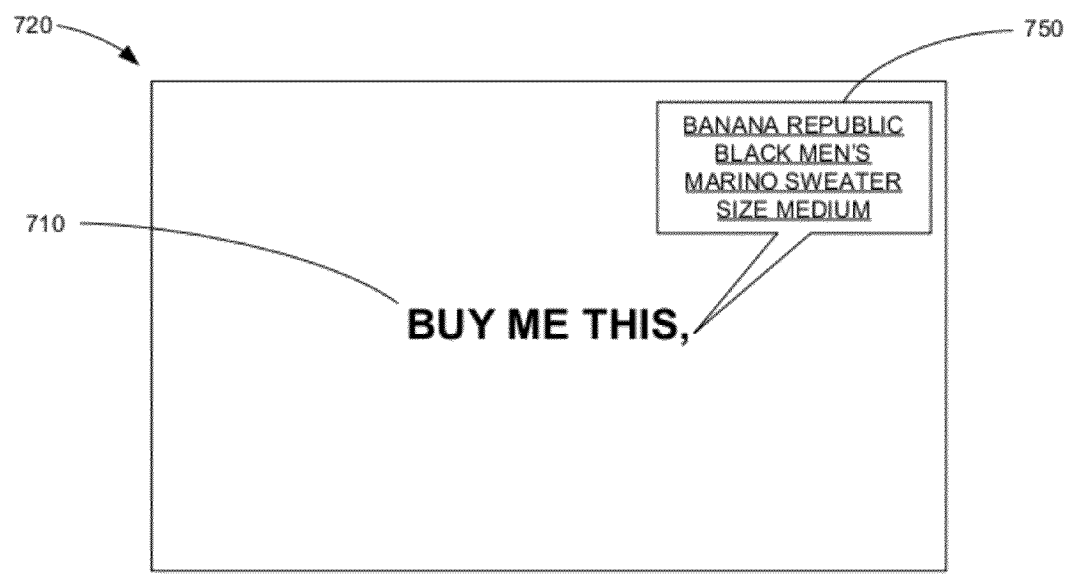
FIG. 7D shows an example of a text response to a query for additional information.

In some embodiments, the modification may include a means for obtaining additional information about the context data. For example, a hyperlink to a webpage document may be added to the text message or a query may be made to a server to provide additional information via additional text or another text message. FIG. 7D shows an example text response to a query for additional information about NFC ID#459AA23491 (an arbitrary identification number used for exemplary purposes). In some embodiments, the generation of the query may be initiated manually by a user or automatically if eye-tracking data indicate a comprehension difficulty. Thus, if eye motion data indicates interest on the part of the user, additional data may be obtained that further explains the context data, the term, or both. For example, if the context data is an NFC identifying number, a third-party server may be queried for additional data about an object associated with the NFC number. In FIG. 7D, the text "BANANA REPUBLIC BLACK MEN'S MARINO SWEATER SIZE MEDIUM" 750 provides information about the item associated with the NFC ID number and the word "this."

In some embodiments, the system or method may be customized based on the particular user. For example, a facial recognition operation may be used to identify the user of the mobile device when a text message is being created. The identity of the user may determine certain preset values such as eye-motion thresholds, types of context data that may be included, and types of modification to the text if context data is linked to term, or the like.

The various functionalities, devices, and systems of FIG. 9-11 may be used to implement FIG. 7A-D to generate a context-enriched text message. The context-enriched message may then be communicated to other devices, such as other mobile devices.

Appending Text to a Text Message

Figure 8:
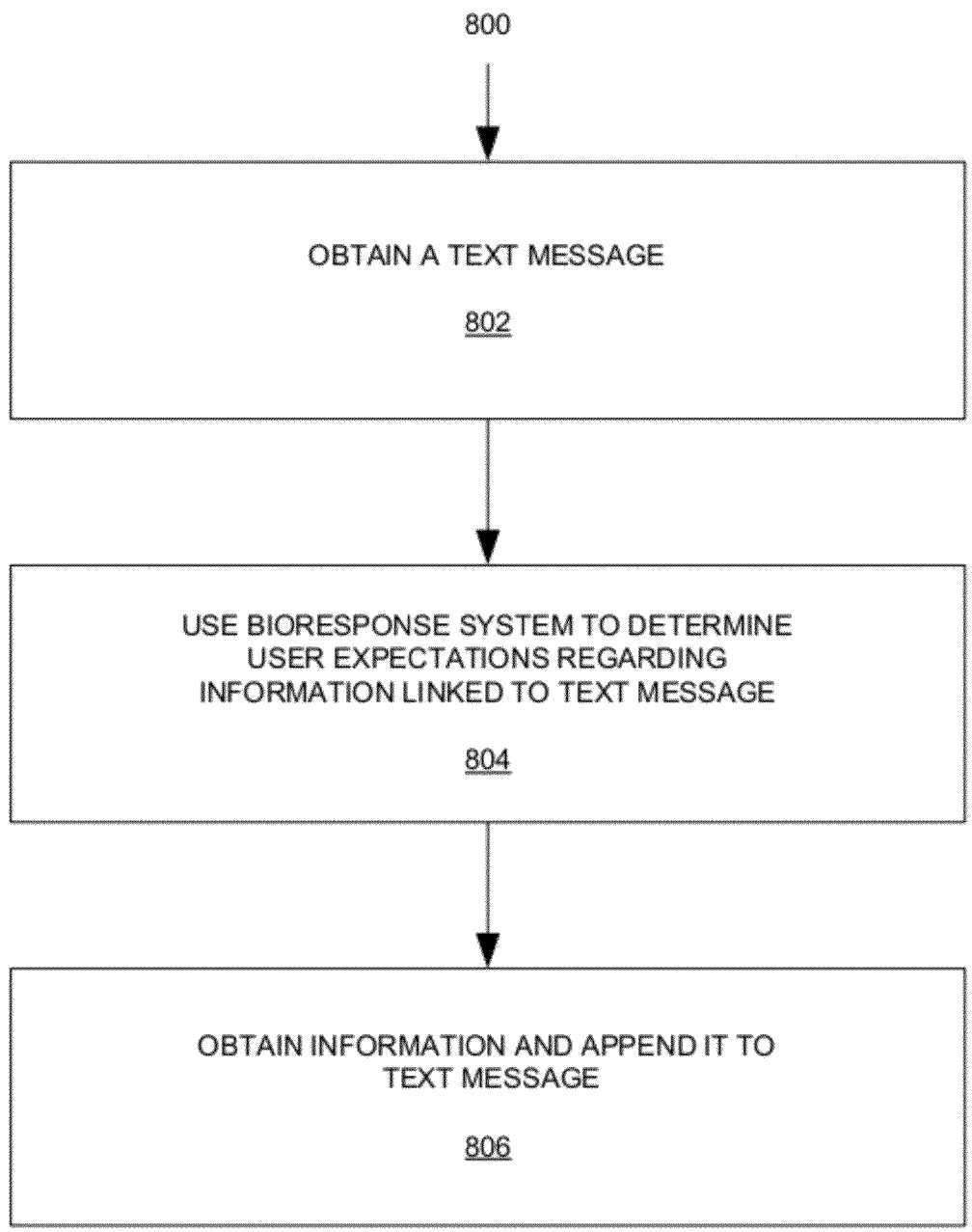
FIG. 8 illustrates an exemplary process for appending information to a text message.

FIG. 8 illustrates another exemplary process 800 for appending information to a text message. In step 802, a text message is obtained. For example, the text message may be generated by a text messaging application of a mobile device such as a smartphone and/or tablet computer. User input may be with a virtual and/or physical keyboard or other means of user input such as a mouse, gaze-tracking input, or the like. In step 804, a bioresponse system, such as a set of sensors that may acquire bioresponse data from a user of the mobile device, may determine user expectations regarding information to be linked to the text message. For example, an eye-tracking system may be used to determine a user's interest in a term of the text message. A meaning of the term may be determined. An environmental attribute of the mobile device or an attribute of the user related to the meaning may be determined. In step 806, the information may be obtained and appended to the text message. For example, a sensor, such as a mobile device sensor, may be used to obtain the environmental attribute of the mobile device or the attribute of the user. In another example, a server and/or database may be queried for information relevant to the term. The information may be included in the text message. For example, sensor data may be formatted as text and included in the text message if the text message is an SMS message. In another example, if the text message is an MMS message, the information may be formatted as a media type such as an audio recording, image, and/or video.

Regarding FIGS. 1, 3, 5, and 8, for purposes of simplicity of explanation, the one or more methodologies shown therein in the form of flow charts have been shown and described as a series of acts. It is to be understood and appreciated, however, that the subject innovation is not limited by the order of acts, as some acts may, in accordance with some embodiments, occur in a different order and/or concurrently with other acts that are shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

Exemplary Environment and Architecture

FIG. 9 illustrates an exemplary messaging service system 900 in which one or more embodiments may be implemented. Communication network(s) 900 may include any suitable circuitry, device, system, or combination of these operatives to create communications network 900. For example, communication network 900 may include a wireless communications infrastructure including communications towers and telecommunications servers, an IP network, or the like. Communication network 900 may provide wireless communications using any suitable short-range or long-range communications protocol. In some embodiments, communication network 900 may support Wi-Fi (e.g., an 802.11 protocol), Bluetooth™, high frequency systems (e.g., 900 MHz, 2.4 GHz, and 5.6 GHz communication systems), infrared systems, other relatively localized wireless communication protocols, or any combination thereof. In some embodiments, communication network 900 may support protocols used by wireless and cellular phones and personal email devices. Such protocols may include, for example, GSM, GSM plus EDGE, CDMA, UMTS, quadband, and other cellular protocols. In another example, a long-range communications protocol may include protocols for placing or receiving calls using Voice Over Internet Protocol (VOIP). Furthermore, in some embodiments, communication network 900 may include an internet-protocol (IP) based network such as the Internet. Communications network 900 operatively couples the various computer systems of FIG. 9, such as the mobile devices 902 and 904, the communications server 906 and the third-party server 908, as well as other servers and devices (e.g., MSC, SMSC, gateways, or the like) not shown for purposes of clarity.

Mobile devices 902 and 904 may include mobile computing devices (e.g., a smartphone such as an iPhone®, a Motorola Droid®, or a Blackberry®, wireless handheld device, or the like) such as the one described in conjunction with FIG. 2. Mobile devices 902 and 904 may include smartphone capabilities such as a web browser, an SMS application, an MMS application, an EMS application, other types of text messaging applications (e.g., IMS), cellular telephony, an internet telephony application (e.g., VoIP), or the like.

In some embodiments, mobile devices 902 and 904 may also include an application for transmitting and receiving files that include context data to communications server 906 and/or third-party server 908. Mobile devices 902 and 904 include context data acquisition and analysis capabilities. In some embodiments, mobile devices 902 and 904 may communicate through communications server 906 to scale the processing and data storage capabilities. Thus, communications server 906 may include the same functionalities, devices, and applications as described with regards to mobile devices 902 and 904. Moreover, communications server 906 may include additional circuits and/or software functionalities configured to include context-enhancement data in a text message. Context-enhancement data may be used to enhance the presentation of a text message and/or context data with, for example, additional graphics, mashups, additional data, or the like. In some embodiments, context-enhancement data may be obtained from third-party server 908.

In some embodiments, communications server 906 may interface with a component of a cellular network, such as a value-added service provider (VASP). In some embodiments, communications server 906 may reside on a message center of a cellular network. In this way, communications server 906 may configure an incoming context-enriched message into a format compatible with a particular cellular network and/or text-message protocol. In some embodiments, communications server 906 may store portions of a context-enriched message for later access by a receiving mobile device while delivering other portions of the context-enriched message. For example, communications server 906 may store the context data portion of the context-enriched message while forwarding the text portion and a hyperlink. The hyperlink may provide the location of the context data on a document hosted by communications server 906. In some embodiments, communications server 906 may receive a text message separately from context data. Communication server 906 may format the text message and the context data into a context-enriched message. In some embodiments, communications server 906 may receive a text message, parse the text message, and query the sending mobile device for context data (e.g., use a table). In one example, the type of context data chosen by the communications server 906 (or the mobile device) may be determined to match the meaning of a word or phrase of the text message. In some embodiments, communication server 906 may include the applications found in system environment 1000 (e.g., the applications 1034) of FIG. 10.

FIG. 10 is a diagram illustrating an exemplary system environment 1000 configured to perform any one of the above-described processes. The system includes a conventional computer 1002. Computer 1002 may include circuitry or other specialized hardware for carrying out some or all aspects of the processes. In some operational settings, computer 1002 may be configured as a system that includes one or more units, each of which is configured to carry out some aspects of the processes either in software, hardware, or some combination thereof. In FIG. 10, computer 1002 includes a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, EISA, or the like. The system memory 1006 includes read only memory (ROM) 1010 and random access memory (RAM) 1012. A basic input/output system (BIOS) 1014, containing the basic routines that help to transfer information between elements within the computer 1002, such as during startup, is stored in ROM 1010.

At least some values based on the results of the above-described processes can be saved for subsequent use. The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media may provide non-volatile storage of data, data structures, computer-executable instructions, or the like, for the computer 1002. The computer program may be written, for example, in a general-purpose programming language (e.g., Pascal, C, C++, Java) or some specialized application-specific language. Although the description of computer-readable media above refers to a hard disk, a removable magnetic disk, and a CD, it should be appreciated by those skilled in the art that other types of media which are readable by a computer, such as magnetic cassettes, flash memory, digital video disks, Bernoulli cartridges, or the like, may also be used in the exemplary operating environment 1000, and further that any such media may contain computer-executable instructions for performing the methods of the embodiments.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 and program modules 1036 may include a location annotation scheme in accordance with an aspect of an embodiment. In some embodiments, application programs may include eye-tracking modules, facial recognition modules, parsers (e.g., natural language parsers), lexical analysis modules, text-messaging argot dictionaries, dictionaries, learning systems, or the like.

A user may enter commands and information into the computer 1002 through one or more user input devices, such as a keyboard 1040 and a pointing device (e.g., a mouse 1042). Other input devices (not shown) may include a microphone, a game pad, a satellite dish, a wireless remote, a scanner, or the like. These and other input devices are often connected to the processing unit 1004 through a serial port interface 1044 that is coupled to the system bus 1008, but may be connected by other interfaces, such as a parallel port, a game port, or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 may operate in a networked environment using logical connections to one or more remote computers 1060. The remote computer 1060 may be a workstation, a server computer, a router, a peer device, or other common network node, and typically includes many or all of the elements described relative to the computer 1002, although for purposes of brevity, only a memory storage device 1062 is illustrated in FIG. 10. The logical connections depicted in FIG. 10 may include a local area network (LAN) 1064 and a wide area network (WAN) 1066. Such networking environments are commonplace in offices, enterprise-wide computer networks, intranets, and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, is connected to a communications server on the LAN, or has other means for establishing communications over the WAN 1066, such as the Internet. The modem 1070, which may be internal or external relative to the computer 1002, is connected to the system bus 1008 via the serial port interface 1044. In a networked environment, program modules (including application programs 1034) and/or program data 1038 may be stored in the remote memory storage device 1062. It will be appreciated that the network connections shown are exemplary and other means (e.g., wired or wireless) of establishing a communications link between the computers 1002 and 1060 may be used when carrying out an aspect of an embodiment.

In accordance with the practices of persons skilled in the art of computer programming, the embodiments have been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits, which causes a resulting transformation or reduction of the electrical signal representation, and the maintenance of data bits at memory locations in the memory system (including the system memory 1006, hard drive 1016, floppy disks 1020, CDROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

In some embodiments, system environment may include one or more sensors (not shown). In certain embodiments, a sensor may measure an attribute of a data environment, a computer environment, and a user environment, in addition to a physical environment. For example, in another embodiment, a sensor may also be a virtual device that measures an attribute of a virtual environment such as a gaming environment. Example sensors include, inter alia, global positioning system receivers, accelerometers, inclinometers, position sensors, barometers, WiFi sensors, RFID sensors, near-field communication (NFC) devices, gyroscopes, pressure sensors, pressure gauges, time pressure gauges, torque sensors, ohmmeters, thermometers, infrared sensors, microphones, image sensors (e.g., digital cameras), biosensors (e.g., photometric biosensors, electrochemical biosensors), an eye-tracking system (which may include digital camera(s), directable infrared lasers, accelerometers, or the like), capacitance sensors, radio antennas, galvanic skin sensors, GSR sensors, EEG devices, capacitance probes, or the like.

In some embodiments, the system environment 1000 of FIG. 10 may be modified to operate as a mobile device. In addition to providing voice communications functionality, mobile device 1000 may be arranged to provide mobile packet data communications functionality in accordance with different types of cellular radiotelephone systems. Examples of cellular radiotelephone systems offering mobile packet data communications services may include GSM with GPRS systems (GSM/GPRS), CDMA systems, Enhanced Data Rates for Global Evolution (EDGE) systems, EV-DO systems, Evolution Data and Voice (EV-DV) systems, High Speed Downlink Packet Access (HSDPA) systems, High Speed Uplink Packet Access (HSUPA), 3GPP Long-Term Evolution (LTE), and so forth. Such a mobile device may be arranged to provide voice and/or data communications functionality in accordance with different types wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile device may be arranged to perform data communications in accordance with different types of shorter-range wireless systems, such as a wireless personal area network (PAN) system. One example of a suitable wireless PAN system offering data communication services may include a Bluetooth system operating in accordance with the Bluetooth Special Interest Group series of protocols, including Bluetooth Specification versions v1.0, v1.1, v1.2, v2.0 or v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI technique may include passive or active radiofrequency identification (RFID) protocols and devices.

Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), third-generation (3G) networks, and fourth-generation (4G) networks. Versions of SMS messaging are described in GSM specifications such as GSM specification 03.40 "Digital cellular telecommunications system (Phase 2+); Technical realization of the Short Message Service" and GSM specification 03.38 "Digital cellular telecommunications system (Phase 2+); Alphabets and language-specific information."

In general, SMS messages from a sender terminal may be transmitted to a Short Message Service Center (SMSC), which provides a store-and-forward mechanism for delivering the SMS message to one or more recipient terminals. Successful SMS message arrival may be announced by a vibration and/or a visual indication at the recipient terminal. In some cases, the SMS message may typically contain an SMS header including the message source (e.g., telephone number, message center, or email address) and a payload containing the text portion of the message. Generally, the payload of each SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

A long message having more than 140 bytes or 160 7-bit characters may be delivered as multiple separate SMS messages. In some cases, the SMS infrastructure may support concatenation allowing a long message to be sent and received as multiple concatenated SMS messages. In such cases, the payload of each concatenated SMS message is limited to 140 bytes but also includes a user data header (UDH) prior to the text portion of the message. The UDH contains segmentation information for allowing the recipient terminal to reassemble the multiple concatenated SMS messages into a single long message. In addition to alphanumeric characters, the text content of an SMS message may contain iconic characters (e.g., smiley characters) made up of a combination of standard punctuation marks such as a colon, dash, and open bracket for a smile.

Multimedia Messaging (MMS) technology may provide capabilities beyond those of SMS and allow terminals to send and receive multimedia messages including graphics, video, and audio dips. Unlike SMS, which may operate on the underlying wireless network technology (e.g., GSM, CDMA, TDMA), MMS may use Internet Protocol (IP) technology and be designed to work with mobile packet data services such as General Packet Radio Service (GPRS) and Evolution Data Only/Evolution Data Optimized FIG. 11 illustrates another block diagram of a sample computing environment 1100 with which embodiments may interact. The system 1100 further illustrates a system that includes one or more clients 1102. The client(s) 1102 may be hardware and/or software (e.g., threads, processes, computing devices). The system 1100 also includes one or more servers 1104. The server(s) 1104 may also be hardware and/or software (e.g., threads, processes, computing devices). One possible communication between a client 1102 and a server 1104 may be in the form of a data packet adapted to be transmitted between two or more computer processes. The system 1100 includes a communication framework 1110 that may be employed to facilitate communications between the client(s) 1102 and the server(s) 1104. The client(s) 1102 are connected to one or more client data stores 1106 that may be employed to store information local to the client(s) 1102. Similarly, the server(s) 1104 are connected to one or more server data stores 1108 that may be employed to store information local to the server(s) 1104.

Although the present embodiments have been described with reference to specific example embodiments, various modifications and changes may be made to these embodiments without departing from the broader spirit and scope of the various embodiments. For example, the various devices, modules, etc., described herein may be enabled and operated using hardware circuitry, firmware, software, or any combination of hardware, firmware, and software (e.g., embodied in a machine-readable medium).

In addition, it will be appreciated that the various operations, processes, and methods disclosed herein may be embodied in a machine-readable medium and/or a machine-accessible medium compatible with a data processing system (e.g., a computer system), and may be performed in any order (e.g., including using means for achieving the various operations). Accordingly, the specification and drawings are to be regarded in an illustrative rather than a restrictive sense. In some embodiments, the machine-readable medium may be a non-transitory form of machine-readable medium.

What is claimed as new and desired to be protected by Letters Patent of the United States is:

1. A computer-implemented method of sending a text message from a user of a user device to a second user, the method comprising:
    displaying text message input from the user of the user device;
    determining eye-tracking data from the user, wherein the eye-tracking data is associated-with a portion of the text message;
    determining an information related to the portion of the text message, wherein the information is determined based on at least one of a meaning or a context of the portion of the text message, and wherein the information comprises a context-data type relevant to the meaning of the portion; automatically and dynamically creating a linkage between the information related to the portion of the text message and the portion of the text message when the eye-tracking data exceeds a specified threshold, wherein the portion of the text message is modified to indicate the linkage; and
    sending, the text message to the second user, wherein the text message comprises the information related to the portion of the text message and the portion of the text message.

2. The computer-implemented method of claim 1, wherein the specified threshold is indicated if the eye-tracking data from the user exceeds a threshold number of regressions for the portion of the text message.

3. The computer-implemented method of claim 1, wherein the specified threshold is indicated if the eye-tracking data from the user indicates a fixation on the portion of the text message, wherein the fixation exceeds a predetermined period of time.

4. The computer-implemented method of claim 3, wherein the predetermined period of time is 1500 milliseconds.

5. The computer-implemented method of claim 1, wherein the specified threshold is indicated if the eye-tracking data exceeds a threshold based on a saccadic pattern associated with the portion of the text message.

6. The computer-implemented method of claim 1, wherein the information is based on a sensor associated with the user device.

7. The computer-implemented method of claim 6, wherein the sensor provides data based on at least one of global position, temperature, pressure, or time.

8. A non-transitory computer-readable storage medium comprising computer-executable instructions for sending a text message from a user of a user device to a second user, the computer executable instructions comprising instructions for:
    displaying a text message input from the user of the user device;
    determining eye-tracking data from the user, wherein the eye-tracking data is associated with a portion of the text message;
    determining an information related to the portion of the text message, wherein the information is determined based on at least one of a meaning or a context of the portion of the text message, and wherein the information comprises a context-data type relevant to the meaning of the portion; automatically and dynamically creating a linkage between the information related to the portion of the text message and the portion of the text message when the eye-tracking data exceeds a specified threshold, wherein the portion of the text message is modified to indicate the linkage; and
    sending the text message to the second user, wherein the text message comprises the information related to the portion of the text message and the portion of the text message.

9. The non-transitory computer-readable storage medium of claim 8, wherein the specified threshold is indicated if the eye-tracking data from the user exceeds a threshold number of regressions for the portion of the text message.

10. The non-transitory computer-readable storage medium of claim 8, wherein the specified threshold is indicated if the eye-tracking data from the user indicates a fixation on the portion of the text message, wherein the fixation exceeds a predetermined period of time.

11. The non-transitory computer-readable storage medium of claim 8, wherein the information is based on a sensor associated with the user device.

12. A computer system for sending a text message from a user of a user device to a second user, the system comprising:
    memory configured to store the text message; and
    one or more processors configured to:
        display a text message input from the user of the user device;
        determine eye-tracking data from the user, wherein the eye-tracking data is associated-with a portion of the text message;
        determine an information related to the portion of the text message, wherein the information is determined based on at least one of a meaning or a context of the portion of the text message, and wherein the information comprises a context-data type relevant to the meaning of the portion; automatically and dynamically create a linkage between the information related to the portion of the text message and the portion of the text message when the eye-tracking data exceeds a specified threshold, wherein the portion of the text message is modified to indicate the linkage; and
        send the text message to the second user, wherein the text message comprises the information related to the portion of the text message and the portion of the text message.

13. The computer system of claim 12, wherein the specified threshold is indicated if the eye-tracking data exceeds a threshold based on a saccadic pattern associated with the portion of the text message.

14. The computer system of claim 12, wherein the information is based on a sensor associated with the user device.

15. The computer system of claim 12, wherein creating a linkage between the information with the portion of the text message further comprises changing the color of the portion of the text message.

* * * * *